(12) United States Patent
Sasse

(10) Patent No.: US 6,910,561 B2
(45) Date of Patent: Jun. 28, 2005

(54) CLUTCH ARRANGEMENT

(75) Inventor: Christoph Sasse, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/469,671

(22) PCT Filed: Jan. 29, 2002

(86) PCT No.: PCT/EP02/00899
§ 371 (c)(1),
(2), (4) Date: Sep. 2, 2003

(87) PCT Pub. No.: WO02/070913
PCT Pub. Date: Sep. 12, 2002

(65) Prior Publication Data
US 2004/0069586 A1 Apr. 15, 2004

(30) Foreign Application Priority Data
Mar. 2, 2001 (DE) .......................... 101 10 097
May 25, 2001 (DE) .......................... 101 25 628

(51) Int. Cl.⁷ .............................................. F16D 13/72
(52) U.S. Cl. ............................... 192/70.12; 192/113.36
(58) Field of Search ........................ 192/70.12, 113.36, 192/113.26, 107 C

(56) References Cited

U.S. PATENT DOCUMENTS

| | | | | |
|---|---|---|---|---|
| 2,107,954 A | | 2/1938 | Wade | |
| 3,897,860 A | * | 8/1975 | Borck et al. ............. | 192/113.36 |
| 4,027,758 A | * | 6/1977 | Gustavsson et al. ... | 192/113.36 |
| 4,516,672 A | | 5/1985 | Caray | |
| 5,240,095 A | * | 8/1993 | Shimamura et al. ...... | 192/70.12 |
| 5,452,783 A | * | 9/1995 | Thirion | |
| | | | De Briel et al. ......... | 192/107 C |
| 5,850,899 A | * | 12/1998 | Drexl ....................... | 192/70.14 |
| 5,913,395 A | * | 6/1999 | Takakura et al. ......... | 192/70.12 |
| 5,967,285 A | * | 10/1999 | Mohan et al. ............ | 192/70.12 |
| 6,142,280 A | | 11/2000 | Koike | |
| 6,293,382 B1 | * | 9/2001 | Nishide et al. ......... | 192/113.36 |
| 6,294,854 B1 | | 9/2001 | Grosspietsch | |
| 6,352,147 B1 | * | 3/2002 | Orlamunder et al. .. | 192/113.26 |
| 6,394,243 B1 | | 5/2002 | Sasse | |
| 6,454,072 B1 | * | 9/2002 | Merkel et al. ........... | 192/70.12 |
| 2002/0121817 A1 | * | 9/2002 | Weimer ........................ | 310/54 |

FOREIGN PATENT DOCUMENTS

| | | |
|---|---|---|
| FR | 1 113 195 A | 3/1956 |
| FR | 2 251 747 A | 6/1975 |
| JP | 60 018623 A | 6/1985 |

* cited by examiner

Primary Examiner—Rodney H. Bonck
(74) Attorney, Agent, or Firm—Cohen, Pontani, Lieberman & Pavane

(57) ABSTRACT

A clutch arrangement, especially for a motor vehicle, comprising a housing arrangement (12) which is filled or which can be filled with fluid, at least one first friction element (22) which can be jointly rotated with the housing arrangement (12) and at least one second friction organ (24) which can be jointly rotated with an output element (18) and which can be brought to rest against the at least one first friction element (22) in order to produce at least one interactive friction effect. At least one friction element (22, 24) is embodied in such a way that fluid can circulate around at least certain areas of the friction elements (22, 24).

31 Claims, 14 Drawing Sheets

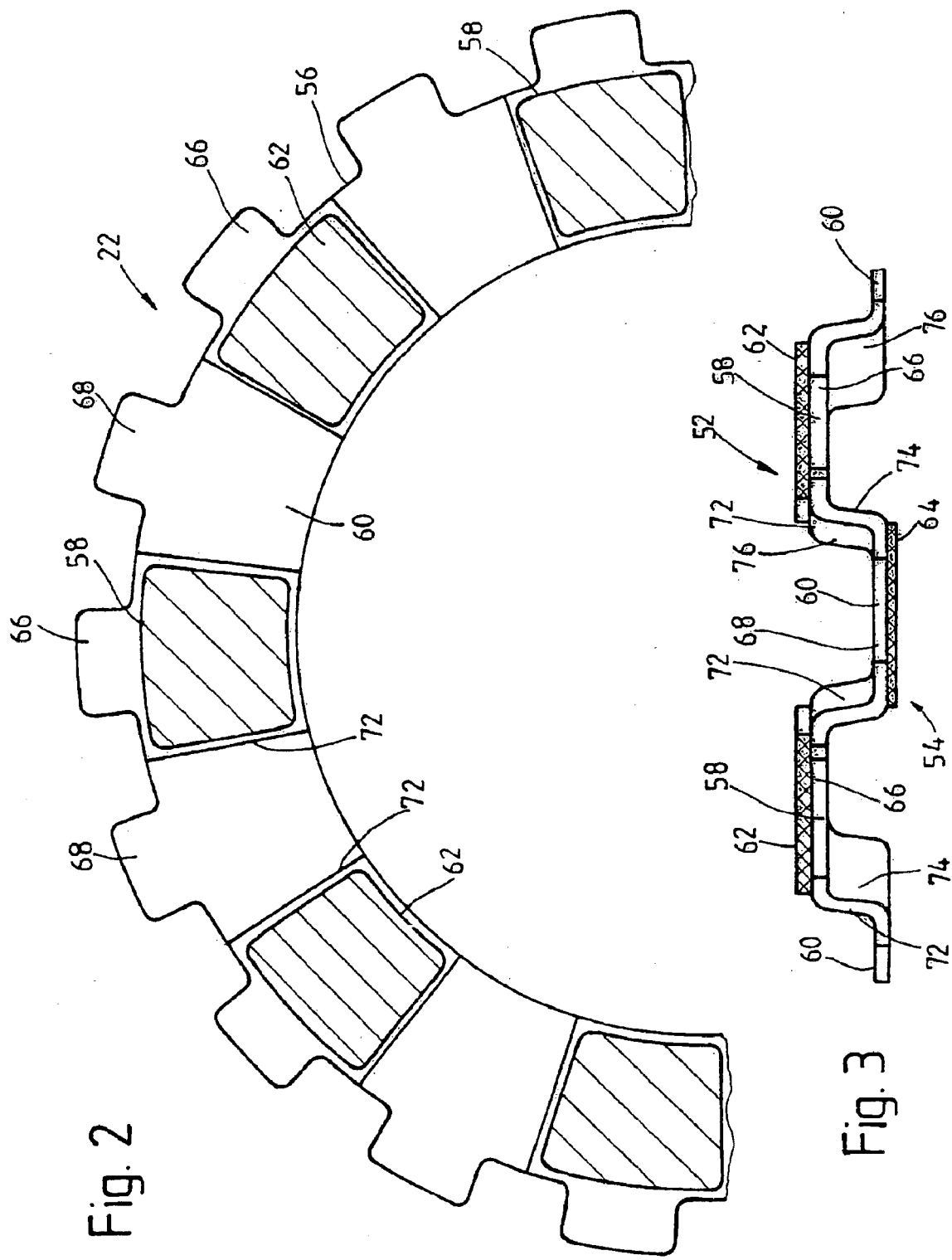

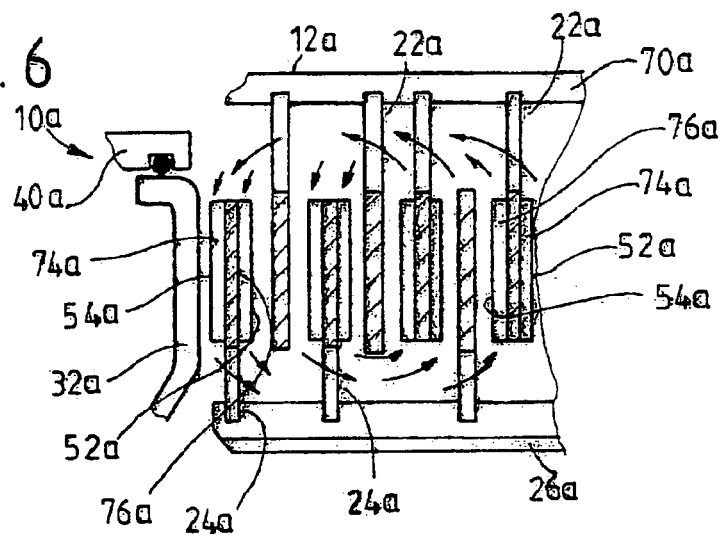
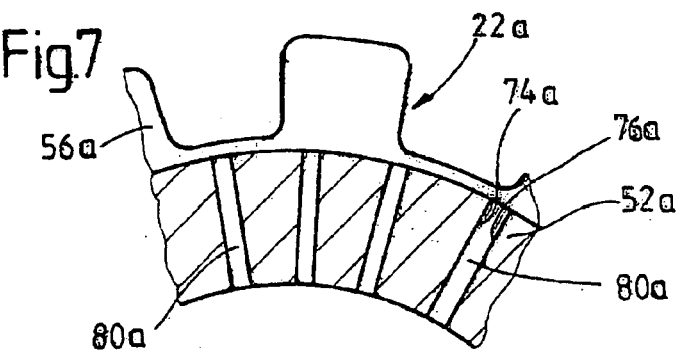
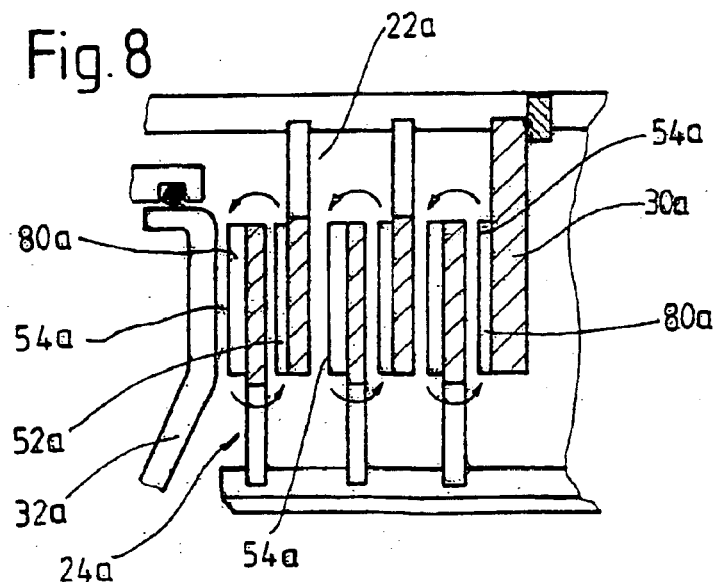

CLUTCH ARRANGEMENT

PRIORITY CLAIM

This is a U.S. national stage of application No. PCT/EP02/00899, filed on 29 Jan. 2002. Priority is claimed on that application and on the following application(s): Country: Germany, Application No.: 101 10 097.3, Filed: 02 Mar. 2001; Country: Germany, Application No.: 101 25 628.0, Filed: 25 May 2001.

BACKGROUND OF THE INVENTION

1. Field of the Invention

The present invention relates to a clutch arrangement, in particular for a motor vehicle, comprising a housing arrangement which is filled or can be filled with fluid, at least one first friction element which can be rotated together with the housing arrangement, and at least one second friction element which can be rotated together with an output element and can be brought to rest against at least one first friction element in order to produce a frictional interaction.

2. Description of the Related Art

A clutch arrangement of this type, which is generally also known as a wet clutch, is disclosed, for example, in DE 199 17 893 A1, which corresponds to U.S. Pat. No. 6,394,243. This clutch arrangement comprises a plurality of friction elements, referred to in general as discs, which can be brought into frictional interaction with one another. A clutch piston can be used to press these disks against one another, with the result that a torque transmission produced by Coulomb friction can be obtained between the housing arrangement and an output shaft. In the slip mode, in particular, for example when starting up, the friction elements, which slide frictionally on one another, cause at least some of the driving torque of the drive assembly to be converted into heat. Especially during slip states which last for a prolonged period, for example when starting up on a hill, this may lead to overheating in the region of the friction elements and possibly to friction linings being damaged. In order to ensure cooling, a fluid flow arrangement is provided which can be used, for example, using a fluid-conveying pump provided in the transmission arrangement, to introduce fluid into the housing arrangement and to remove fluid from the housing arrangement. In this case, the fluid flows along the friction elements, absorbs heat and transports this heat out of the region of the clutch arrangement. The fluid which is heated up as it flows through the clutch arrangement can then be cooled again, for example in a transmission cooler. The flow of fluid which is built up in this manner is comparatively slow and results, for example, in a quantity of fluid of approximately 10 l/mm flowing around the various friction elements. At very high loads, even with this amount of circulating flow, the required dissipation of heat can often not be achieved.

It is the object of the present invention to provide a wet clutch arrangement, in particular for a motor vehicle, in which, even at a high load, the risk of at least local overheating can be largely eliminated.

SUMMARY OF THE INVENTION

According to the invention, at least one friction element to be designed to cause the fluid to circulate around at least some areas of the friction elements.

Since, in the case of the clutch arrangement according to the invention, it is therefore the friction elements themselves which induce a circulation of fluid which flows around them, with the intention not being to rule out other elements contributing to causing the fluid to circulate, the effect achieved is that the fluid which is present in the housing arrangement, before it is exchanged within the context of the flow of fluid which is generally present, flows a number of times along the friction elements and thus, owing to the existing heat storage capacity of the fluid, can use said fluid to remove significantly more heat than would be possible if it were only to flow once along the friction elements. This arrangement is advantageous particularly in the case of temporary, heavy loads which then lead to an increase in the temperature of the fluid. Within the context of the exchange of fluid which is generally present, this fluid which has been brought to significantly higher temperatures is, however, drawn off from the housing arrangement and brought back to a normal temperature in the transmission cooler or in another cooler. The circulation of fluid according to the invention, which is induced by means of the friction elements themselves, can induce flows in which the flow around the friction elements or at least some of them is at a quantity of fluid of 3000 l/min.

One measure which can be used to provide a very high fluid-conveying efficiency is for at least one first friction element and at least one second friction element to be designed in a manner to cause the fluid to circulate. Provision may preferably be made for at least one first friction element to have at least one fluid-conveying surface, and for at least one second friction element to have at least one fluid-conveying surface. It should be emphasized here that, within the context of the present invention, a fluid-conveying surface is a surface which acts on the fluid which is to be induced to circulate, in order to set said fluid into motion, i.e., for example, in order to give the fluid a flow velocity in the circumferential direction and therefore to ensure that centrifugal forces cause this fluid to be moved radially outward. However, a fluid-conveying surface is also a surface which ensures, for example in the manner of a turbine wheel, that the torque of a fluid induced to flow is supported, and therefore ultimately particularly also on the basis of the difference in rotational speed which is present between two fluid-conveying surfaces, contributes to the fluid being conveyed and therefore to causing the fluid to circulate, which induces the cooling effect according to the invention. A further significant aspect in the present invention is that the circulation of fluid which is built up can not only better remove heat from the region of those surface areas which are acted upon thermally, but also that by supporting the torque, this circulation of fluid also contributes in the manner of a pump/turbine arrangement to the torque transmission. This means that, in the case of wet clutches of this type, the torque transmission capacity can be increased. Furthermore, this torque transmission, which is produced by the fluid circulating, is already effective in a state in which the surface-area regions which can be brought frictionally into interaction with one another are not yet in contact.

In order to be able to provide fluid-conveying efficiency which is as good as possible, according to the present invention, provision may be made for the at least one fluid-conveying surface to have a component of radial extent and a component of axial extent.

For example, provision may be made for the at least one fluid-conveying surface to be designed at least in some regions with an essentially tangentially orientated surface perpendicular.

In one embodiment according to the invention which can be constructed in a particularly simple manner, the at least one fluid-conveying surface can be provided by the at least one first friction element or/and the at least one second friction element having, on at least one axial side, a friction lining arrangement which provides the at least one fluid-conveying surface. This can be realized, for example, by the at least one fluid-conveying surface comprising at least one wall which bounds a groove-like channel in the friction lining arrangement in the circumferential direction.

In order to be able to further increase the fluid-conveying efficiency, it is proposed that the at least one first friction element or/and the at least one second friction element has, on both axial sides, friction lining arrangements which each provide fluid-conveying surfaces.

In one embodiment which distributes the friction load particularly well to various friction elements, provision can be made for the at least one first friction element or/and the at least one second friction element to have, just on one axial side, a friction lining arrangement which provides at least one fluid-conveying surface, and for a friction lining arrangement of a further friction element to lie opposite the other axial side.

In an alternative embodiment which can provide a high fluid-conveying efficiency, provision may be made for the at least one first friction element or/and the at least one second friction element to have a friction lining carrier which, preferably on at least one axial side, carries a friction lining arrangement, and for at least one fluid-conveying surface to be provided by the friction lining carrier. This can be achieved, for example, by the friction lining carrier having lining-carrying sections which follow one another in the circumferential direction, are offset axially with respect to one another and are connected to one another by connecting sections, and for the at least one fluid-conveying surface to be provided by a connecting section.

In order to be able to undertake the construction in a manner which is as simple as possible, it is proposed that the friction lining carrier is formed by deformation of an essentially ring-like sheet-metal blank.

It may furthermore be provided that on the lining-carrying sections, which are offset axially with respect to one another, lining segments of respective friction lining arrangements are provided on the axial sides of said lining-carrying sections, which are in each case directed away from one another.

A very high fluid-conveying efficiency can be obtained if a plurality of fluid-conveying surfaces, which follow one another in the circumferential direction, are provided on the at least one first friction element or/and on the at least one second friction element.

In the clutch arrangement according to the invention, a pressing element can be provided by means of which the first and second friction elements can be brought into frictional interaction with each other, the pressing element dividing an interior region of the housing arrangement into a first space region containing the friction elements and a second space region.

As already discussed, it is advantageous to ensure a virtually constant exchange of the fluid which is present in the housing arrangement in order to be able to remove the heat stored therein. It is therefore proposed that a fluid flow arrangement is provided for feeding fluid into the first space region and for removing fluid from the first space region essentially independently of the circulation of fluid.

In an alternative embodiment, provision may be made for the first space region to be essentially completely sealed off with respect to the exchange of fluid.

In order to set a torque-transmitting state, provision may be made for fluid to be able to be introduced into the second space region in order to act upon the pressing element so as to produce the frictional interaction of the friction elements.

In an alternative embodiment, the torque-transmitting state can be obtained by the fact that the pressing element can be acted upon by an actuating arrangement, which is provided essentially outside the housing arrangement, in order to produce the frictional interaction.

In order to remove heat as readily as possible from the region of the surface areas which interact frictionally with one another, a circulation of fluid which is as strong as possible is advantageous. Therefore, according to a further advantageous aspect of the present invention, provision may be made for the at least one first friction element or/and the at least one second friction element to have a friction lining carrier with a tab-like bent section which contributes to causing the fluid to circulate.

Furthermore, it is advantageous, in order to obtain an efficient circulation of fluid in the clutch arrangement according to the invention, that the number of fluid-conveying surfaces provided on the at least one first friction element or/and the number of fluid-conveying surfaces provided on the at least one second friction element is in the region of 6–48, preferably around 24, or/and that in the at least one first friction element or/and in the at least one second friction element:

an internal dimension of the fluid-conveying surface to an external dimension of a fluid-conveying surface is in a ratio in the region of 0.35–0.85, preferably approximately 0.6, or/and an external dimension of an outer fluid-deflecting space to an external dimension of a fluid-conveying surface is in a ratio in the region of 1.03–1.2, preferably approximately 1.1, or/and an internal dimension of an inner fluid-deflecting space to an internal dimension of a fluid-conveying surface is in a ratio of 0.4–0.9, preferably approximately 0.7.

In a further preferred embodiment, provision may be made for an axial dimension of a region of axial extent taken up by the first friction elements contributing to the circulation of fluid to an axial dimension of a region of axial extent taken up by the second friction elements contributing to the circulation of fluid to be in a ratio in the region of 0.5–1.2, preferably approximately 1. In connection with causing the fluid to circulate, it has turned out to be advantageous if a friction lining is provided on at least one first friction element or/and on at least one second friction element, the internal dimension of which is in a ratio in the region of 0.6–0.9, preferably 0.75, to its external dimension.

According to a further aspect, the present invention relates to a clutch arrangement, in particular for a motor vehicle, comprising a housing arrangement which is filled or can be filled with fluid, at least one first friction element which can be rotated together with the housing arrangement, at least one second friction element which can be rotated together with an output element and can be brought to rest against at least one first friction element in order to produce a frictional interaction, and a pressing element which is arranged displaceably in the housing arrangement and by means of which the first and second friction element can be brought into mutual friction interaction.

According to the invention, provision is furthermore made for the pressing element to be acted upon by an actuating arrangement, which is essentially provided outside the housing arrangement, to produce the frictional interaction.

In an arrangement of this type, the actuation is therefore undertaken from outside the housing, for example by means of a conventional engagement or disengagement mechanism, a diaphragm-spring-like energy accumulator or the like. Fluid lines via which fluid has to be conducted into the housing arrangement in order to activate the clutch are not required. A design of this type is advantageous in particular in conjunction with the further principles of the present invention, thus in particular the causing of a circulation of fluid in the region of the surface areas acting frictionally on one another, since here an external supply of fluid in order to cool the regions which are acted upon thermally is not required.

For example, provision may be made for the housing arrangement to be essentially completely sealed off with respect to the exchange of fluid.

Furthermore, a torsional-vibration damping arrangement is preferably provided in the clutch arrangement according to the invention, which damping arrangement can be provided in the torque transmission path between a driving element, which is to be coupled to the housing arrangement, and the at least one first friction element, or/and can be provided in the torque transmission path between the at least one second friction element and the output element.

Furthermore, a starter-generator arrangement can be provided in the clutch arrangement according to the invention, a rotor arrangement, which preferably carries permanent magnets, of the starter-generator arrangement being coupled to the housing arrangement for rotation together.

The present invention furthermore relates to a friction element for a clutch arrangement, comprising a friction lining carrier which, on at least one axial side, carries a friction lining arrangement, and that at least one fluid-conveying surface is provided by the friction lining carrier.

In this case, provision may again be made for the friction lining carrier to have lining-carrying sections which follow one another in the circumferential direction, are offset axially with respect to one another and are connected to one another by connecting sections, and for the at least one fluid-conveying surface to be provided by a connecting section.

The friction lining carrier may, for example, be formed by deformation of an essentially annular sheet-metal blank.

It is furthermore advantageous if on the lining-carrying sections, which are offset axially with respect to one another, lining segments of respective friction lining arrangements of the friction element are provided on the axial sides of said lining-carrying sections, which sides are in each case directed away from one another.

BRIEF DESCRIPTION OF THE DRAWINGS

FIG. 2 shows a partial axial view of a friction element used in the clutch arrangement in FIG. 1;

FIG. 3 shows a view of the friction element illustrated in FIG. 2 radially from the outside;

FIG. 6 shows an alternative embodiment of the clutch arrangement according to the invention;

FIG. 7 shows a partial axial view of a friction element used in the clutch arrangement in FIG. 6;

FIG. 8 shows a view corresponding to FIG. 6 of a further alternative embodiment of the clutch arrangement according to the invention;

DETAILED DESCRIPTION OF THE PREFERRED EMBODIMENT

Figure 1:
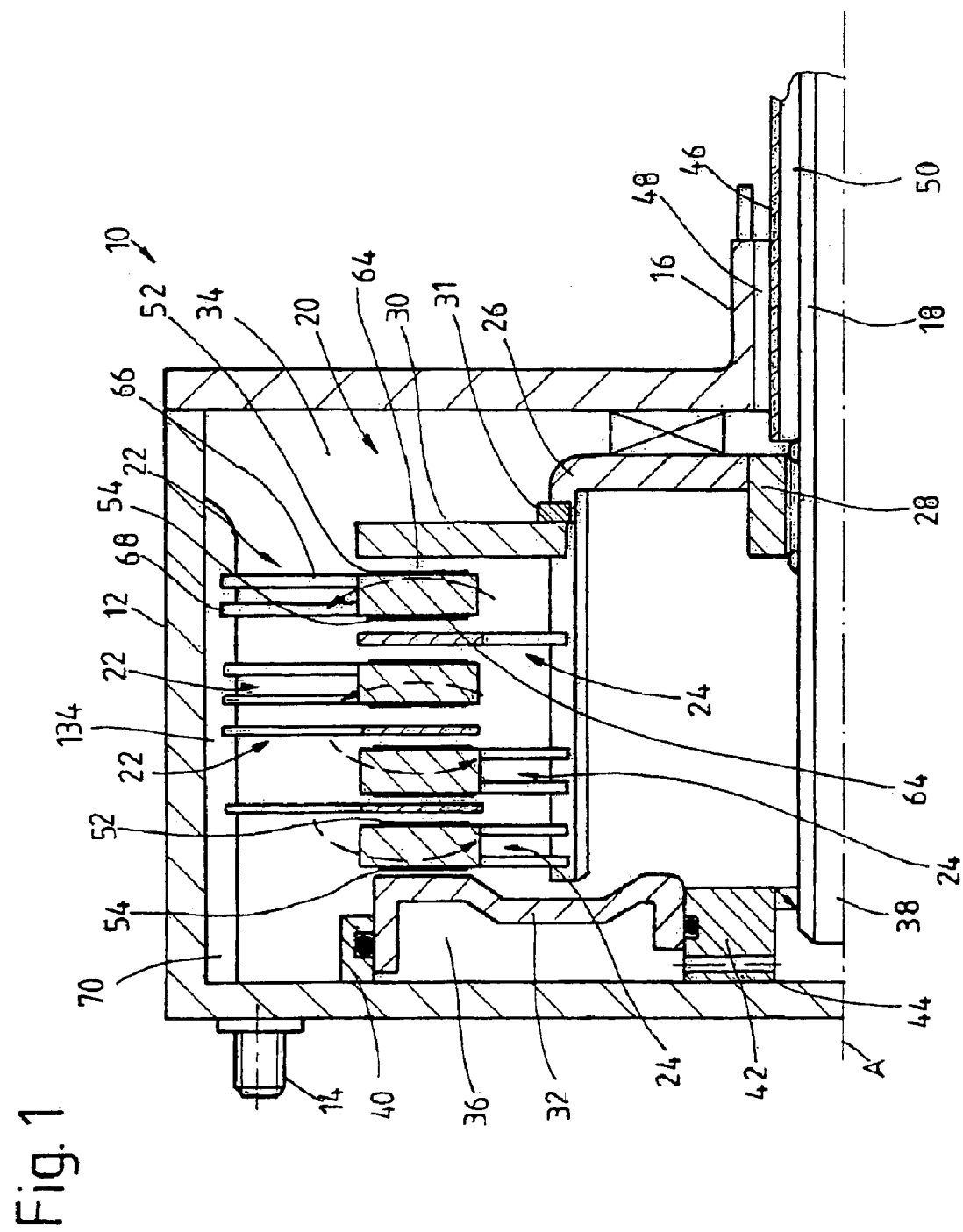
FIG. 1 shows a view of a partial longitudinal section of a clutch arrangement according to the invention.

In FIG. 1, wet clutch arrangement 10 comprises a housing arrangement 12 which can be coupled via a plurality of fastening elements and a coupling element (not illustrated), such as, for example, a flexiplate, to a drive shaft, for example a crankshaft of an internal combustion engine, for rotation together. On the axial side which is situated at a distance from the coupling to the drive shaft, the housing arrangement 12 has a housing hub 16 which engages, for example, in a transmission arrangement (not illustrated) where it drives a fluid-conveying pump such that it rotates. An output shaft 18 which protrudes with its free end into the interior 20 of the housing arrangement 12 is arranged concentrically to the housing hub 16. This output shaft 18 may, for example, be a transmission input shaft.

A plurality of first friction elements 22 which are coupled to the housing arrangement 12 for rotation together is provided in the housing arrangement 12. Furthermore, a plurality of second friction elements 24 is provided, the second friction elements 24 being coupled via a coupling element 26 and an output hub 28 to the output shaft 18 for rotation together. An abutment element 30 is provided in a rotationally fixed manner on the coupling element 26 and in a manner such that it is fixed at least in an axial direction by a securing ring 31. The first friction elements 22 and second friction elements 24 are situated between this abutment element 30 and a clutch piston 32. The clutch piston 32 divides the interior 20 of the housing arrangement 12 into a first space region 34, which contains the friction elements 22, 24, and a second space region 36. Fluid can be introduced into the second space region 36 via a central opening 38, which is provided in the output shaft 18. In order to seal off this second space region 36 with respect to the first space region 34, the clutch piston 32, which is of essentially ring-like design, is held in a fluid-tight, but axially displaceable manner radially on the outside and radially on the inside on respective mounting elements 40, 42 with the interposition of sealing elements. A plurality of fluid-flow ducts 44 which permit fluid to be supplied into the space region 36 are provided in the radially inner mounting element 42.

Fluid can also be introduced into the first space region 34 or fluid can be conducted out of the latter. For this purpose, a hollow-cylindrical separating element 46 is provided, for example, in the space region formed between the output shaft 18 and the housing hub 16, said separating element forming a flow space 48 between the housing hub 16 and itself and furthermore forming a flow space region 50 between the output shaft 18 and itself. Working fluid can be introduced through the flow space region 48 into the space region 34, for example by the fluid-conveying pump which is provided in the transmission arrangement, so that said working fluid flows radially to the outside at the right-hand end of the housing arrangement 12. The fluid then flows around the friction elements 22, 24, passes radially inward and is drawn off again via the flow space region 50. This enables the fluid which has been heated in the housing arrangement 12, as will be described below, to be continuously exchanged and replaced by cooler fluid.

At least some of the first friction elements 22 and some of the second friction elements 24 carry respective friction lining arrangements 52, 54 on their two axial sides. A further friction element is then in each case situated axially opposite said friction lining arrangements 52 and 54 for the purpose of frictional interaction. The various friction elements 22, 24 are supported on the housing arrangement 12 and on the coupling element 26 in a rotationally fixed manner by an engagement in the manner of an axial toothing, and in a manner such that they can be displaced axially in the direction of the axis of rotation A. The construction of a friction element of this type, which is provided with friction lining elements 52, 54, will be described below in respect of a first friction element 22 with reference to FIGS. 2 and 3. It should be pointed out that the basic construction is equally applicable to the second friction elements 24, which are provided with friction lining arrangements 52, 54.

It can be seen in FIG. 2 that this first friction element 22 has a friction lining carrier 56 having an essentially ring-like contour. When viewed radially from the outside, it can be seen that the friction lining carrier 56 is designed with an undulated structure and has lining-carrying sections 58, 60 which are offset with respect to one another in the direction of the axis of rotation A. On their sides facing axially away from one another, the lining-carrying sections 58, 60 carry respective lining segments 62 and 64 of the friction lining arrangements 52, 54. In the region of each of the friction-carrying sections 58, 60, a coupling projection 66 and 68, respectively, is provided radially on the outside and is used to bring about the rotationally fixed coupling to corresponding coupling projections 70 of the housing arrangement 12.

It can furthermore be seen in FIG. 3 that the lining-carrying sections 58, 60, which are offset axially with respect to one another, are connected to one another by connecting sections 72. These connecting sections 72 extend, as can also be seen in FIG. 2, approximately from radially on the inside to radially on the outside and lie essentially in a plane containing the axis of rotation A. For example, the respective connecting sections can be formed with surface perpendiculars standing tangentially to a circumferential circular line. On their surface-area regions which point in the circumferential direction, these connecting sections 72 form fluid-conveying surfaces 74, 76. In this case, the fluid-conveying surfaces 74, 76 of the first friction elements 22 which are coupled to the housing arrangement 12 for rotation together, act, for example in a coupling process in which the first friction elements 22 have a significantly higher speed of rotation than the second friction elements 24, as pump blade surfaces and ensure that a flow of fluid which is guided radially outward is produced in their vicinity. In the same manner, the fluid-conveying surfaces which are provided in a corresponding manner on the second friction elements 24 act as turbine blade surfaces which, owing to the difference in rotational speed between the first friction elements 22 and the second friction elements 24, are used for the fluid, which is set in motion by the fluid-conveying surfaces 74, 76 of the first friction elements 22, for the purpose of supporting the torque and in the process conduct this fluid radially inward, or are used for conveying the fluid radially inward. This fluid, which is conducted or conveyed radially inward by means of the fluid-conveying surfaces of the second friction elements 24, therefore replaces the fluid which is conveyed from radially on the inside to radially on the outside by the fluid-conveying surfaces 74, 76 of the first friction elements 22. A circulation of fluid is therefore built up, as shown by dashed-line arrows in FIG. 1, which ultimately corresponds to the circulation of fluid in the manner produced by an impeller and a turbine wheel of a hydrodynamic torque converter or a fluid clutch. The circulation of fluid produced in the clutch arrangement 10 according to the invention has the effect of inducing a continuous fluid circulation and flow around the friction elements 22, 24 independently of the discussed exchange of the fluid present in the housing arrangement 12, which exchange of fluid can take place, for example, at a rate of 10 l/mm, said circulation of fluid making it possible, for example, to produce a flow around the friction elements 22, 24 with a quantity of liquid of 3000 l/min. This enables the frictional heat which is produced in the various friction elements 22, 24 in the friction or slip mode, especially in starting-up processes which greatly stress these friction elements, to be significantly better absorbed in the fluid. The circulation of fluid which is built up in accordance with the invention is combined with the comparatively slow exchange of fluid, with the result that some of the fluid which has been brought to a comparatively high temperature by the circulation is continuously drawn off and replaced by cooler fluid.

It should be emphasized here that the principle which is illustrated in FIG. 1 of causing the fluid to circulate may, of course, be provided independently of the number of first friction elements or second friction elements. The positioning which is illustrated in FIG. 1 and in which the first friction elements 22, which are designed to convey fluid, are first of all arranged following one another, in which case a respective second friction element 24, which is of essentially plate-like design, is situated between them and then, after a transitional friction element 22 which does not carry any friction linings, are followed by the second friction elements 24 which are designed to convey fluid and between which a first friction element, which is essentially of plate-like design and is not provided with friction linings, is situated, the fluid is caused to circulate all the way around the friction elements 22, 24. A staggered arrangement of first friction elements 22 contributing to producing the fluid flow and of second friction elements 24 contributing to producing the fluid flow enables a plurality of local regions of fluid circulation to be produced in the region of the friction elements 22, 24. It is also not absolutely necessary to provide the same number of first friction element 22 and second friction element 24, which are designed to produce the fluid. For example, first friction elements 22 which act more as impellers or pump blades may be provided.

It can furthermore be seen that in the axially central region two first friction elements 22 follow each other, thus providing a non-effective pairing of friction surfaces. This can be avoided, for example, by ultimately no friction linings being provided on the friction lining carriers of the first friction elements 22, but on all second friction elements 24, in particular also on the plate-like, second friction element 24 which can be seen on the right in FIG. 1, friction linings being provided on both sides. In the context of the present invention, a friction surface carrier of this type which does not carry any friction linings can nevertheless be viewed as a friction lining carrier particularly in respect of the construction which is relevant to conveying fluid.

Figure 4:
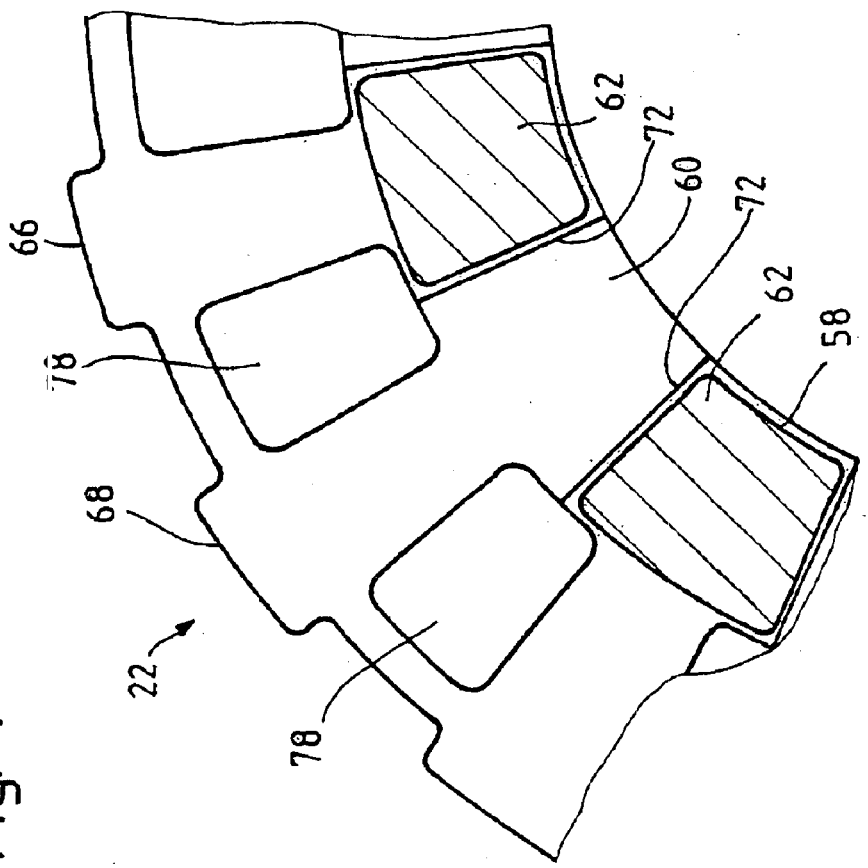
FIG. 4 shows a partial axial view of a friction element designed in an alternative manner.

FIG. 4 illustrates a modified embodiment of a first friction element 22. It can be seen in comparison to the embodiment according to FIG. 2 that the projections 66, 68, which are used for the rotational coupling and are offset with respect to one another, are shifted radially further outward and that fluid passage openings 78 are provided between the individual friction lining segments of the friction lining arrangements, in each case in the transition region situated in the circumferential direction between the lining-carrying sections 58, 60. These fluid passage openings 78 permit the fluid to circulate essentially unhindered. In the embodiment according to FIG. 5, these fluid passage openings 78 are open radially outward, so that comparatively long stretched-out projections 66, 68 are provided here in each case in the radial direction for coupling to the corresponding formation 70 of the housing arrangement 12. The various connecting sections 72 are in each case also provided here to provide the fluid-conveying surfaces, which can be seen in FIG. 3.

Figure 5:
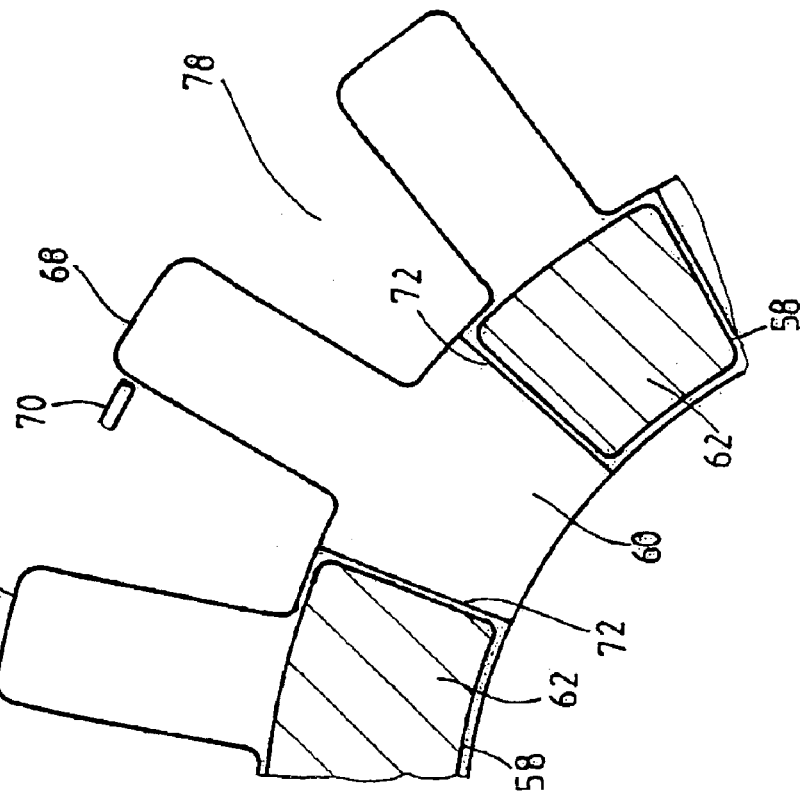
FIG. 5 shows a modification of the friction element illustrated in FIG. 4.

It should be emphasized that the embodiments according to FIGS. 4 and 5 may also be used with the second friction elements 24, which are coupled to the output shaft 18, in which case the various openings and coupling projections then extend radially inward with respect to the region which carries the friction lining segments.

Figure 12:
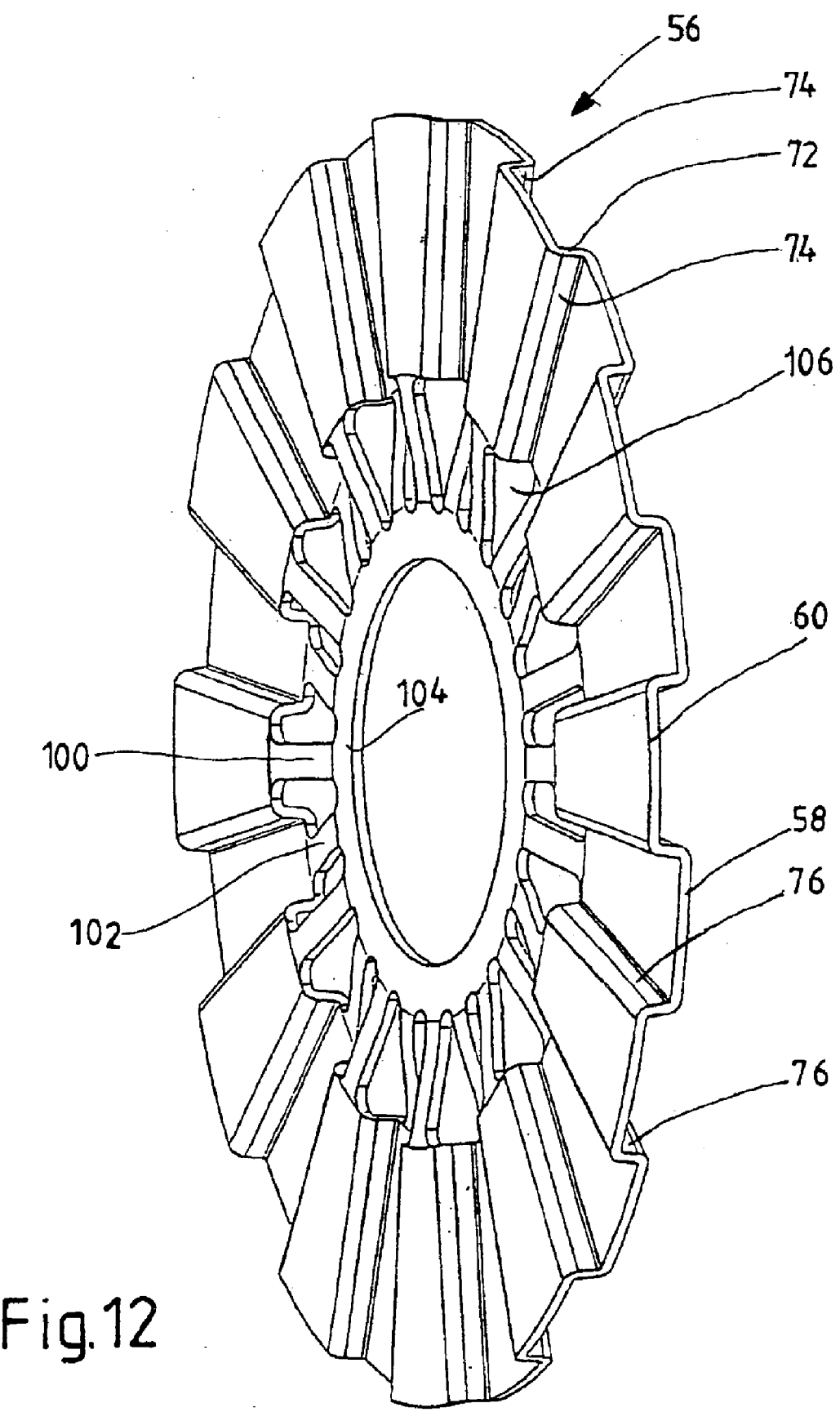
FIGS. 12–15 show various embodiments of friction lining carriers for outer and inner disks.

FIGS. 12–15 illustrate various design variants of friction lining carriers 56 both for the second friction elements 24, which are to be coupled to the output shaft 18, and for the first friction elements 22, which are to be coupled to the housing arrangement 12. A friction lining carrier 56 for a friction element 24, which is to be coupled to the output shaft 18, can be seen in FIG. 12. Said friction lining carrier has, as already previously described, the various lining-carrying sections 58, 60 which are offset axially with respect to one another and are coupled to one another by the connecting sections 72. The connecting sections 72 again form the fluid-conveying surfaces 74, 76 on the surface areas which are orientated in the circumferential direction. A web section 100, 102 extends radially inward from each of the lining-carrying sections 58, 60. Said web sections lead into a radially inner, ring-like section 104 which has, on its inner circumferential side, a toothing (not illustrated) for the rotationally fixed coupling to the coupling element 26. Since the lining-carrying sections 58, 60 are offset axially with respect to one another, the web sections 100, 102, which in each case extend from them, run in the pattern which is illustrated in FIG. 12 at an inclination with respect to the axis of rotation A or a plane which is orthogonal thereto. Passage openings 106 are formed in each case between the individual web sections 100, 102 and the fluid which has been induced to circulate can pass through them in the axial direction.

Figure 13:
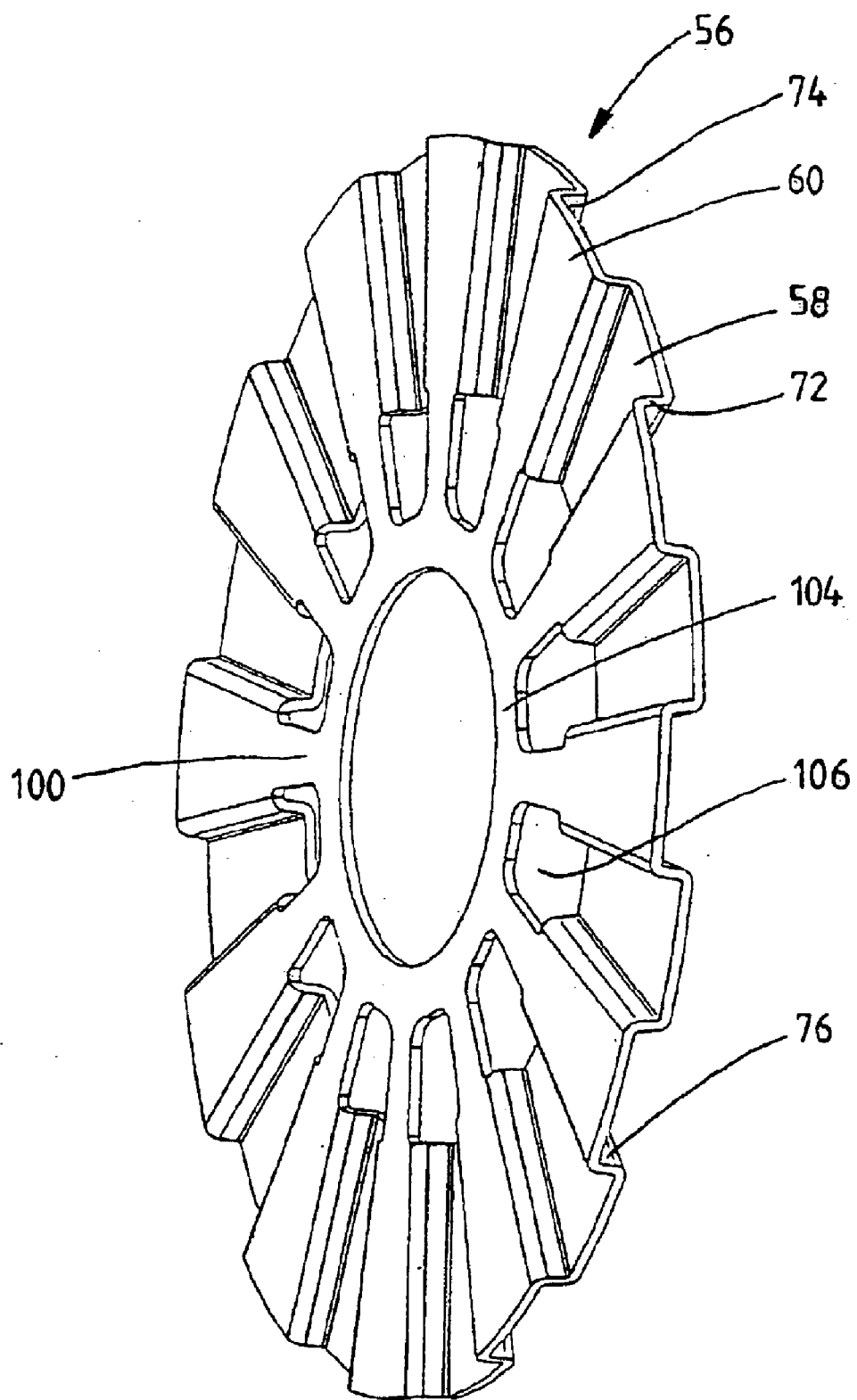

In the design variant which is illustrated in FIG. 13, web sections 100 extend just from one set of lining-carrying sections 58, 60, namely from the lining-carrying section 60. The lining-carrying sections 58 are not attached directly to the ring section 104 in their radially inner region. This produces a configuration in which the web sections 100 can lie in the same plane as the lining-carrying sections 60 and in which furthermore, owing to the halved number of web sections, which can then be somewhat wider, the openings 106 formed between the individual web sections 100 are in principle larger.

Figure 14:
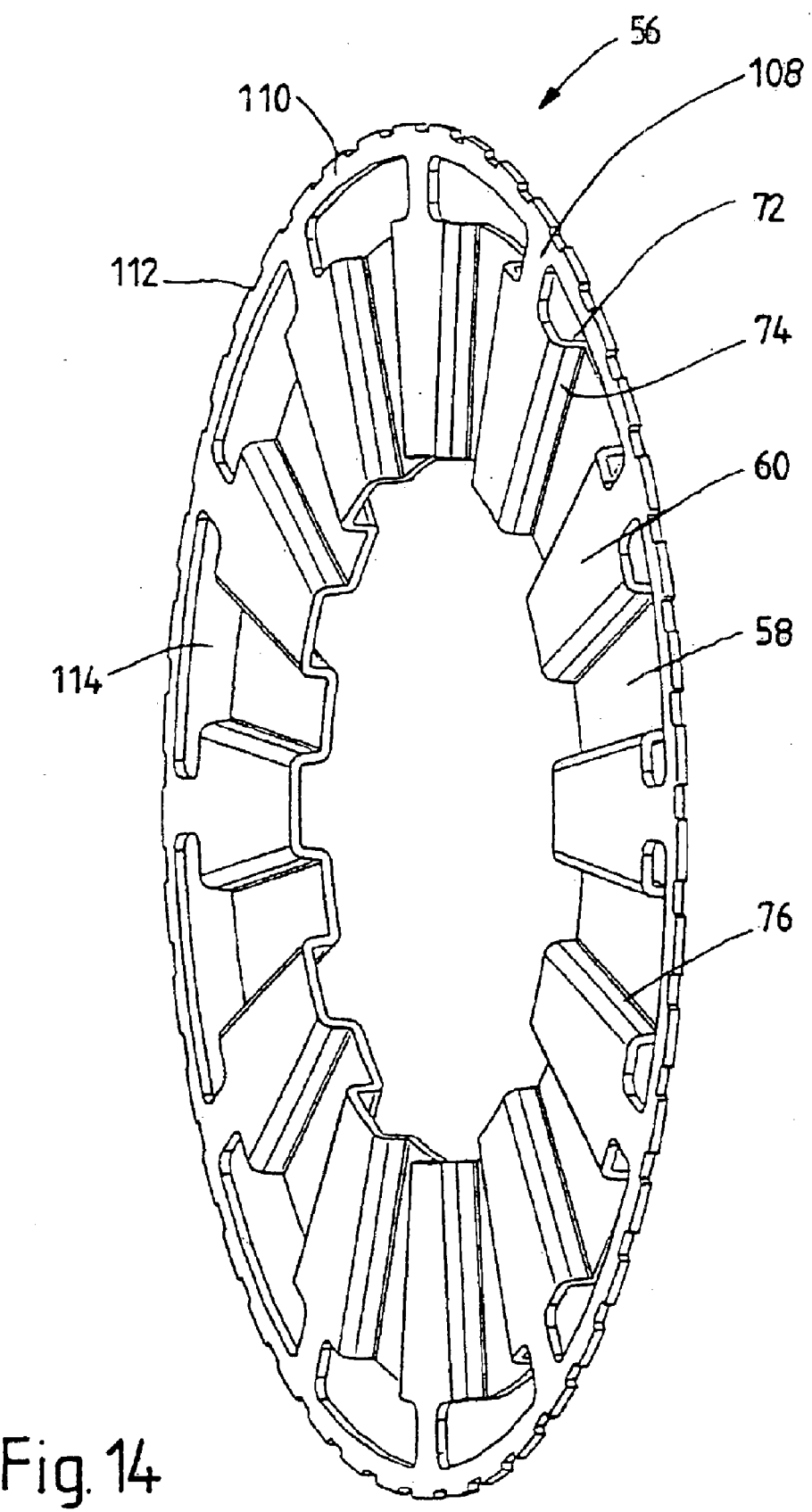

FIG. 14 illustrates a friction lining carrier 56 for a friction element which is to be coupled radially on the outside, i.e. for example, a friction element 22 which is to be coupled to the housing arrangement 12. The lining-carrying sections 58, 60, which are offset axially with respect to one another, and the connecting sections 72 connecting them, with the fluid-conveying surfaces 74, 76 provided on them, can also be seen again here. Web sections 108 which lead into an outer ring section 110 adjoin the lining-carrying sections 60 axially on the outside. Said ring section has an external toothing 112 for the rotationally fixed coupling, for example, to the coupling projections 70. Openings 114 are again provided in the circumferential direction between the individual web sections 108 and the fluid can pass through them in the axial direction. It should be emphasized here that web sections may, of course, also or additionally emerge radially outward from the lining-carrying sections 58, thus again resulting in the provision of the inclined orientation of the various web sections, which can be seen in the example of FIG. 12.

Figure 15:
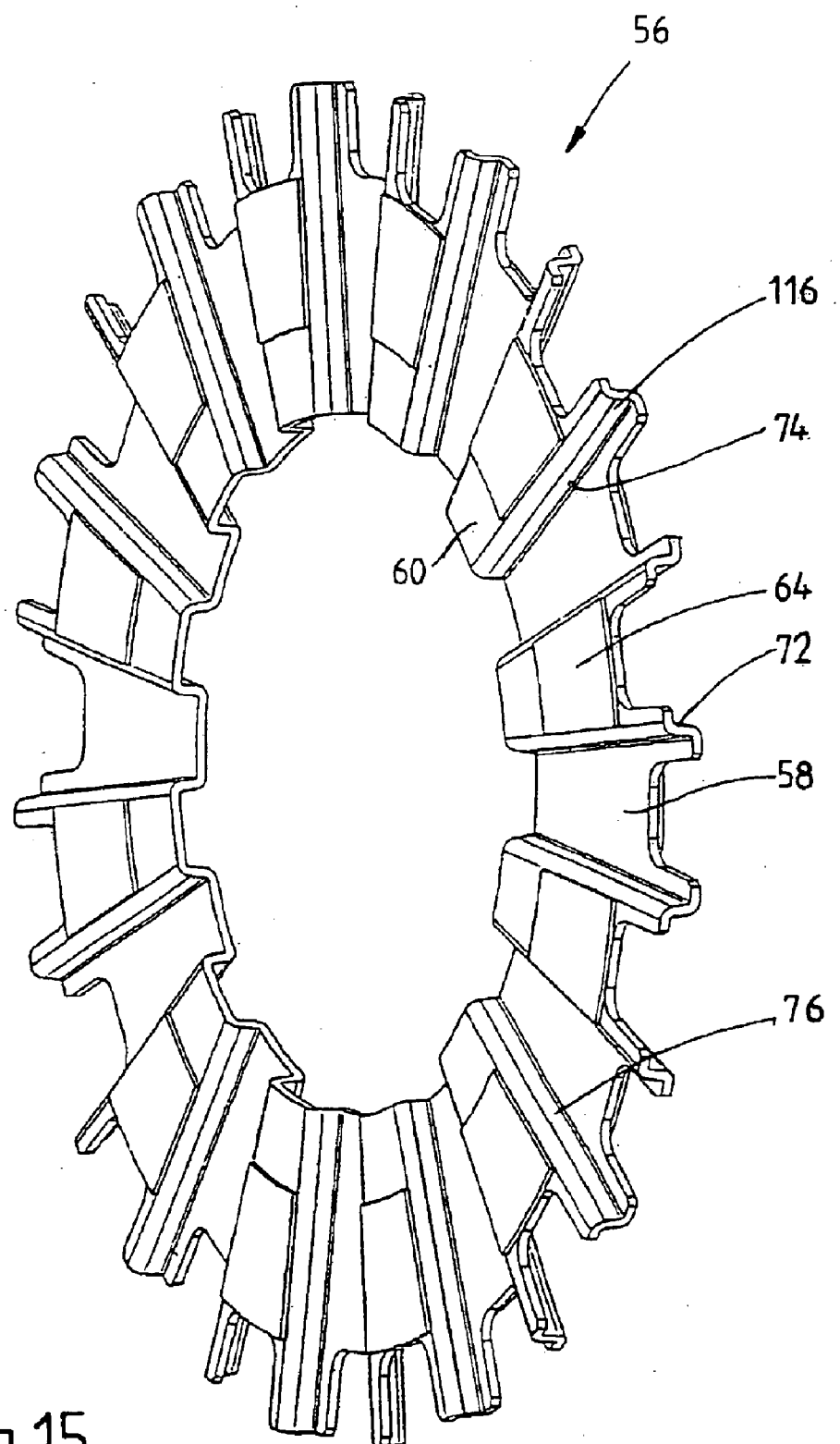

In the design variant which is illustrated in FIG. 15, projections 116 which protrude radially outward are formed in the transition region between the lining-carrying sections 60, 58. Since these projections 116 extend over the connecting sections 72 and the lining-carrying sections 58 from the lining-carrying sections 60, they have approximately an S contour or a double-angled contour and are therefore very stiff and suitable for transmitting large torques.

A further modification of the principles illustrated above can be seen in FIGS. 16–18. In this embodiment, the various friction elements are constructed in each case from at least one annular-disk-like sheet-metal element. The first and second friction elements 22, 24 which contribute to the circulation of fluid each comprise two such sheet-metal elements 118, 120, 122, 124 formed in the manner of conventional disks. Whereas the sheet-metal elements 118, 120 have the openings 114 radially on the outside again for the axial passage of fluid, the sheet-metal elements 122, 124 have the openings 106 radially on the inside for the passage of fluid. An arrangement which provides the fluid-conveying surfaces is inserted between two of these sheet-metal elements 118, 120, 122, 124 in each case. Said arrangement may comprise, for example, the conveying-surface element 126 which can be seen in FIG. 17. Said element again has sections 58, 60 which are offset axially with respect to one another, correspond to the lining-carrying sections in the variants described previously and are connected to one another by connecting sections 72. Each of these connecting sections 72 again provides the fluid-conveying surfaces 74, 76 on both of its circumferential sides. The conveying-surface element 126 can be connected fixedly, for example by soldering, bonding or the like, to the associated sheet-metal elements 118, 120 and 122, 124, which are produced, for example, by punching. It should be emphasized that, of course, conveying-surface arrangements constructed in another manner, for example from a plurality of parts, may also be provided here. The friction elements 22', 24', which do not directly contribute to the circulation of fluid, are designed in the manner of conventional disks, i.e. likewise comprise annular-disk-like sheet-metal elements or the like which carry friction linings on both of their axial sides. It should be emphasized that, of course, friction linings can also be provided on the friction elements 22, 24 which produce the circulation of fluid. Friction linings with duct-like hollows provided on their surface areas may especially be used here, with the result that fluid can also flow in these surface-area regions to improve the removal of heat. It is furthermore also emphasized that, in the clutch arrangement according to the invention, those friction elements which contribute, owing to an appropriate geometry, to causing the fluid to circulate, do not necessarily also have to carry the friction linings. For example, the conveying-surface element which is illustrated in FIG. 17 can be integrated in a clutch arrangement without friction linings provided on it, and mating friction elements, which are, for example, of annular disk-like design and bear friction linings which, for example, are continuous in the circumferential direction, can be provided on both sides of said conveying-surface element. It is also, of course, possible, in an arrangement as will be described below with reference to FIGS. 6–11, to provide surface-area ducts in friction elements, which are constructed, for example, from sheet metal, and then on corresponding mating friction elements to provide, in the circumferential direction, either continuous friction linings or friction linings, for example, likewise having surface-area ducts.

Figure 16:
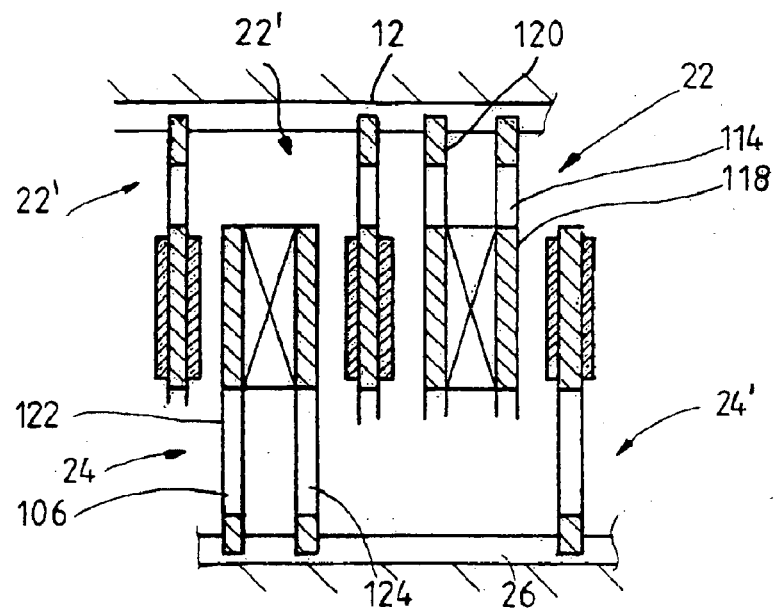
FIG. 16 shows a partial sectional view of an alternative type of embodiment of a clutch arrangement according to the invention.
Figures 17, 18:
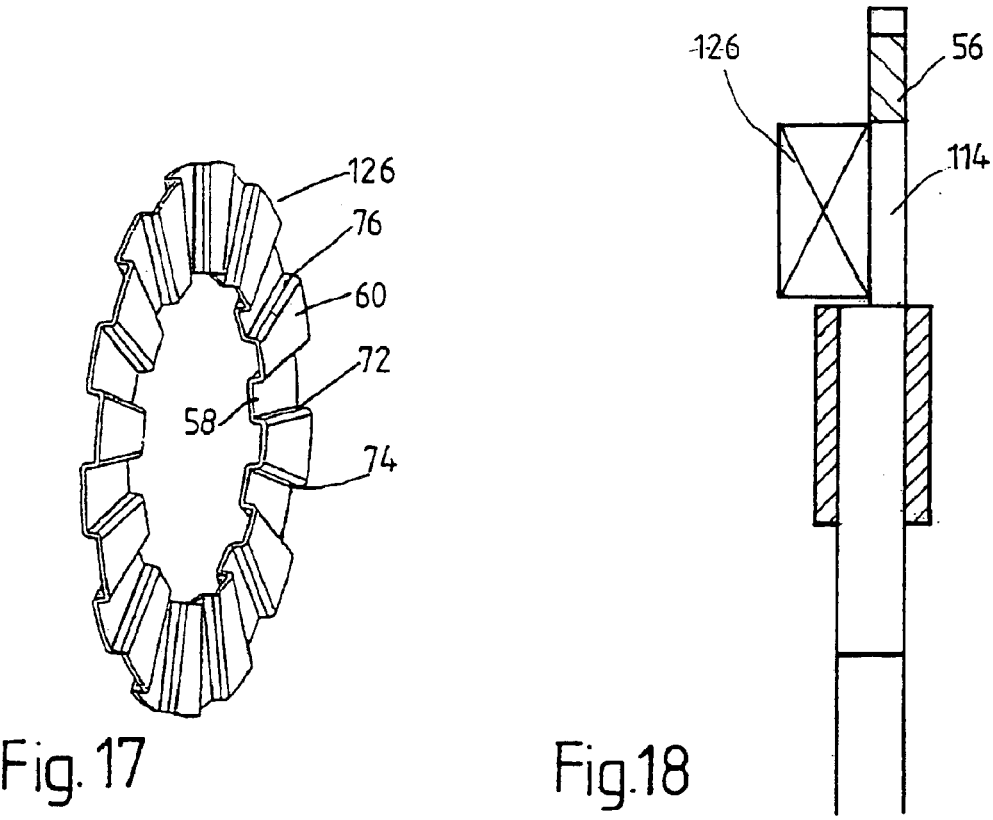
FIG. 17 shows a perspective view of a fluid-conveying-surface element which can be used in the embodiment according to FIG. 16.
FIG. 18 shows a sectional view of a friction element.

The design which can be seen in FIGS. 16 and 17 can be produced in a simple manner owing to the use of standard components and is therefore also cost-effective. In order, in a clutch arrangement according to the invention, to intensify the circulation of fluid even further, it may be provided that, on the various components formed from sheet metal, for example the lining carriers 56 described above, not only are the openings permitting the passage of fluid or recesses provided radially outside or radially within the friction linings, but also additional conveying or blade surfaces are provided. As can be seen in the example of FIG. 18, this can be undertaken, for example, by the fact that when an opening 114 situated radially on the outside is formed, the sheet-metal part is not punched completely, but rather a U-shaped punched section is formed and in this manner a tab 127 which is bent laterally or obliquely is then produced. A plurality of such tabs which follow one another in the circumferential direction act in the manner of conveying blades and intensify the circulation, which has in any case already been provided by the measures according to the invention which have been described above. The angle at which these tabs 127 are bent with regard to a plane which is essentially orthogonal to the axis of rotation A is preferably in the region of approximately 90°, but may also be in the angular range of 15–165°.

A modified embodiment of the clutch arrangement according to the invention is illustrated in FIG. 6. Components which correspond to previously described components are referred to with the same reference numbers with the addition of an "a". Only the substantial structural and functional differences will be discussed below.

In the embodiment according to FIG. 6, friction lining arrangements 52a, 54a, in the form of friction linings designed, for example, in a ring-like manner are again provided on both sides of the first and second friction elements 22a, 24a, which induce the fluid to circulate. As can be seen, for example in FIG. 7 with reference to a first friction element 22a and the friction lining 52a provided on it, the latter has made on it, for example by punching or embossing, a plurality of fluid flow ducts 80a which preferably extend essentially radially. Each of these fluid flow ducts 80a is bounded in the circumferential direction by walls which now provide the fluid-conveying surfaces 74a, 76a. In this case, those fluid-conveying surfaces 74a, 76a which are provided on the first friction elements 22a which can be rotated with the housing arrangement 12a again, in the slip mode, take on the function of the pump blade surfaces while the corresponding fluid-conveying surfaces on the second friction elements 24a again provide the function of the turbine blade surfaces. In this embodiment, the friction lining carriers 56a are provided as sheet-metal parts which are of essentially planar design. It can also be seen here that a second friction element or first friction element, on which no friction linings are provided, is in each case again situated between two first friction elements 22a or second friction elements 24a, which induce the fluid to circulate.

In order to avoid the blind frictional surface, which can also be seen in FIG. 6, between two directly adjacent, first friction elements 22a, an arrangement as is shown in FIG. 8 can be provided. It can be seen here that a friction lining 52a (in the case of the first friction elements 22a) and 54a (in the case of the second friction elements 24a) is provided in each case on just one axial side of the first friction elements 22a and of the second friction elements 24a. Each of these friction linings 52a, 54a again has the discussed ducts 80a. The abutment element 30a can also carry a friction lining 54a of this type having ducts 80a. In this embodiment, the local circulations which have already been discussed previously are then produced. Whereas the embodiment which is illustrated in FIG. 8 has an improved torque transmission capacity with the same number of friction elements owing to the avoidance of a non-effective blind frictional surface, the plurality of local circulations has the effect of achieving a slightly reduced flow volume in comparison to the global circulation flow of FIG. 6. Also, an axially very compact embodiment is obtained. Both the embodiment illustrated in FIG. 6 and the embodiment illustrated in FIG. 8 has the advantage of having a structural design which is extremely simple to produce. It can be seen especially that a significantly smaller axial overall size is achieved owing to the omission of the connecting sections of the embodiment according to FIG. 1, although overall the fluid-conveying surfaces provided in the region of the friction lining arrangements provide a smaller overall surface area and there is thus also a reduced conveying efficiency. In order to counteract this, the axial constructional space which is available should be utilized to make the thickness of the various friction linings and the depth of the grooves made in them to be as great as possible.

Figure 9:
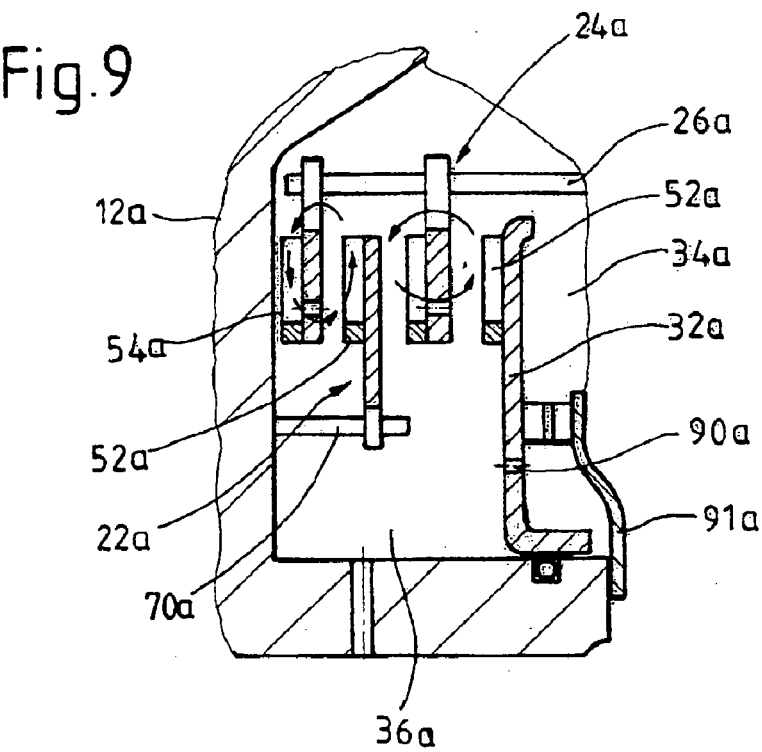
FIG. 9 shows a further illustration of an alternative embodiment of the clutch arrangement according to the invention.

A further modification of the fluid-conveying surfaces in the area of the principle of the invention which uses friction linings is illustrated in FIG. 9. A plurality of first friction elements 22a and at least one second friction element 24a in an axially staggered arrangement are also provided here. The first friction elements 22a and the second friction elements 24a again carry the friction linings or friction lining arrangements 52a, 54a on an axial side. In a modification of the embodiments illustrated previously, the second friction elements 24a, which are coupled via the coupling element 26a to the output shaft, are now designed as "external disks", i.e. their rotational locking projections reach radially outward. The first friction elements 22a are designed as "internal disks" and have inner rotational coupling projections for engagement with corresponding formations 70a on the housing arrangement 12a. A system of the dual-line principle is also illustrated here, in which, in order to produce the engaged state, the fluid pressure in the first space region 34a is increased by increased supply of fluid over the fluid pressure in the second space region 36a. The clutch piston 32a is therefore pressed axially against the friction elements 22a and 24a. At least one passage opening 90a which enables an exchange of fluid even when the clutch arrangement 10a is engaged is provided in the clutch piston 32a. The clutch piston 32a is coupled in a rotationally fixed manner via a rotational coupling arrangement 91a to the housing arrangement 12a, but can be moved axially with respect to the latter. In this case, the clutch piston 32a is therefore also to be considered as the first friction element which can be rotated with the housing arrangement 12a and which ultimately also carries a friction lining 52a.

Figure 10:
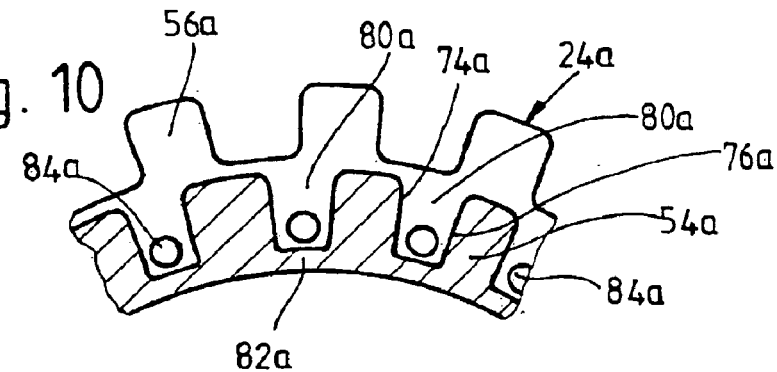
FIG. 10 shows a partial axial view of a friction element used in the embodiment according to FIG. 9.
Figure 11:
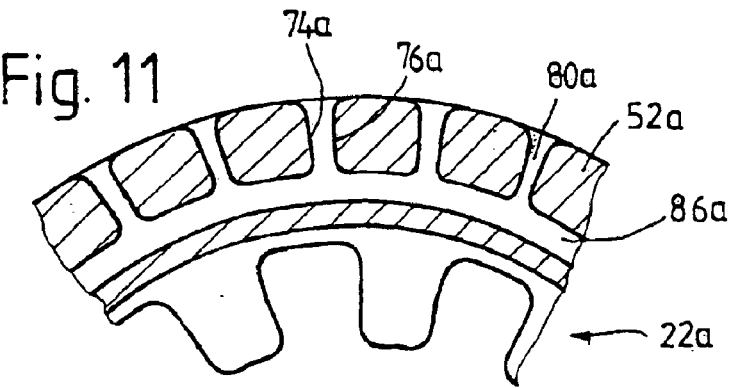
FIG. 11 shows a partial axial view of a further friction element used in the embodiment according to FIG. 9.

In FIG. 10, a partial axial view of a second friction element 24a can be seen. It can be seen that the friction lining 54a provided on it has grooves or ducts 80a which are sealed off radially toward the inside. A radially inner, ring-like section 82a remains. In the radially inner end region of the ducts 80a, passage openings 84a are provided in the friction lining carrier 56a. The friction linings 52a of the first frictional elements 22a, which can be seen in FIG. 11, likewise have a plurality of ducts 80a which are restricted radially to the inside and in their radially inner end region lead into a ring-like duct region 86a. This ring-like duct region 86a lies opposite the passage openings 84a. In the same manner as in the embodiments described previously, the side walls which bound the ducts 80a form respective fluid-conveying surfaces 74a, 76a. In the case of the first friction elements 22a, which can be rotated together with the housing arrangement 12a, these fluid-conveying surfaces 74a, 76a again act as blade surfaces which convey the fluid radially outward, while the fluid-conveying surfaces 74a, 76a, which are provided on the second friction elements 24, assist the flow of fluid radially inward and are used to support the torque. In the design variants which are illustrated in FIG. 9, local circulations are again produced, said circulations extending in each case over a lining carrier of a second friction element 24a, a friction lining 54a of a second friction element 24a and a friction lining 52a of a first friction element 22a. It should be emphasized that, in this embodiment, the coupling element 26a, which lies radially outside the various friction linings 52a, 54a, takes on a function for assisting the deflection of the circulation of fluid in the radially outer region whereas, in the previously described embodiments, this coupling element has provided a corresponding deflection of the circulation of fluid in the radially inner region. The deflection in the radially outer region takes place there by means of those sections of the housing arrangement which are situated radially on the outside. In particular with regard to the embodiments illustrated in FIGS. 6–11, it should be emphasized that friction elements of this type do not, of course, necessarily have to comprise a separate carrier element and separate friction linings attached thereto, for example by bonding. On the contrary, friction elements which are constructed as a single part, for example from fiber composite material, for example carbon fiber composite, may also be provided here, it being possible for said friction elements to then be configured as desired in terms of their geometry, but it also being possible for them to be designed, for example, like the friction elements which can be seen in FIG. 8. Within the context of the present invention, these friction elements then have, on their axial sides, friction linings or friction lining sections which are designed as a single piece with a body region which is designed for attachment to the housing arrangement or to the output shaft.

Of course, in friction elements of this type, in which the friction linings or friction lining sections are thus formed integrally from the same material as the body regions designed for attachment to other components, it is also possible to provide a meandering structure, as can be seen, for example, in FIG. 17.

The embodiments which have been previously described and also those which have yet to be described below, in particular the embodiment illustrated in FIG. 9, are also suitable as a clutch arrangement in a hydrodynamic torque converter or a fluid clutch, i.e. as a "torque converter lockup clutch arrangement". In this case too, when the torque conversion state is brought about, a considerable part of the torque which is introduced is converted into frictional heat which can then be rapidly removed by the circulation induced in accordance with the invention. It is of substantial advantage in all of the embodiments according to the invention that the quantity of fluid which is conveyed during the circulation of fluid increases with increasing difference in rotational speed between the various friction elements which bear frictionally against one another and are effective as pumps or turbines. That is to say, in particular if there is a heavy friction loading, i.e. if there is a large slip, a large quantity of fluid is circulated by the circulation of fluid, with the effect of a significantly improved removal of the heat produced by friction. The circulation of fluid, which is produced in the region of the various surface-area regions themselves which become frictionally effective, ensures that ultimately fluid can be conveyed very rapidly to all of the surface-area regions which are acted upon thermally and heat can be removed from there.

Figure 19:
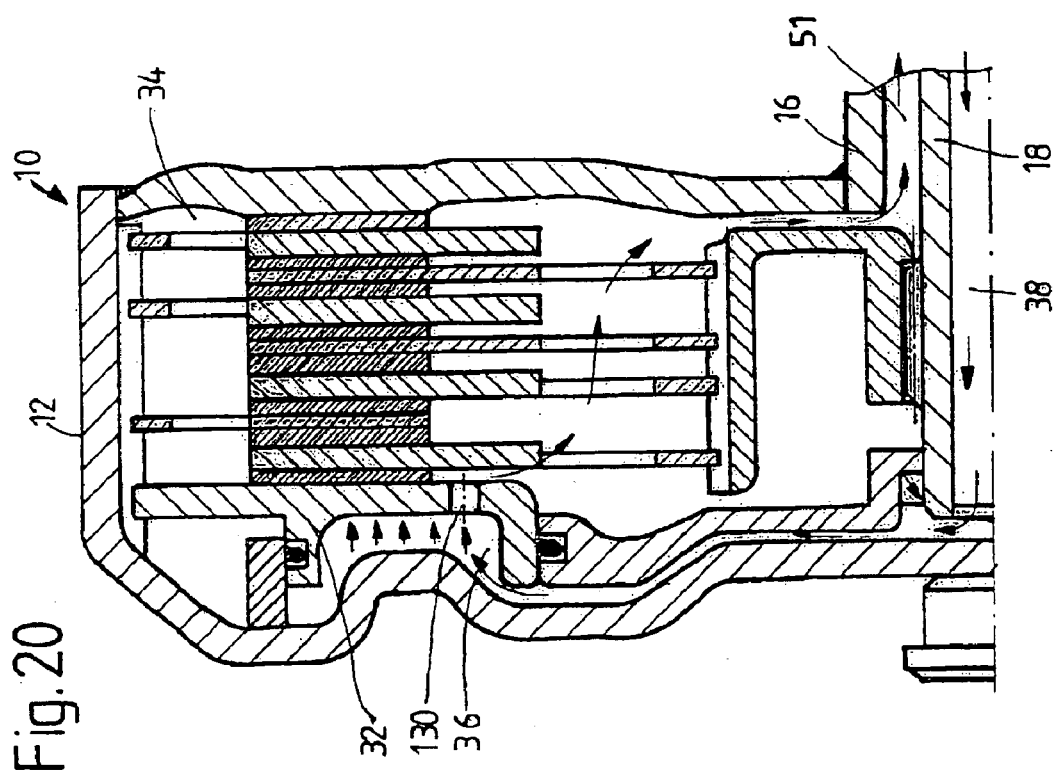
FIGS. 19–21 show views of partial longitudinal sections of clutch arrangements according to the invention which illustrate the various possibilities for the flow of fluid.

In the following text, the various possibilities for the flow of fluid, which is combined or can be combined with the circulation of fluid according to the invention, are illustrated. FIG. 19 thus shows in general a clutch arrangement 10 according to the invention in which the supply and removal of fluid takes place in the manner of a triple-line system. While fluid is introduced into the space region 36 via the central opening 38 in the output shaft 18 for the purpose of axially displacing the clutch piston 32, or is conducted away from there again, fluid is introduced into the space region 34 via a further line which essentially encompasses the flow space region 50. Fluid can be drawn out of the space region 34 again via a further line which encompasses the flow space region 48. It should be emphasized that, in the illustration of FIG. 19, the separating element 46 is effective in the manner of a labyrinth-like seal and can comprise two sealing elements which in principle can be rotated with respect to each other. The advantage of this arrangement is that the engagement and disengagement process can be made completely independently of any states of pressure in the space region 34. Excellent removal of heat, which can be regulated by the transmission, can therefore be obtained. Also, very precise displacement of the clutch piston 32 can be achieved.

Figure 20:
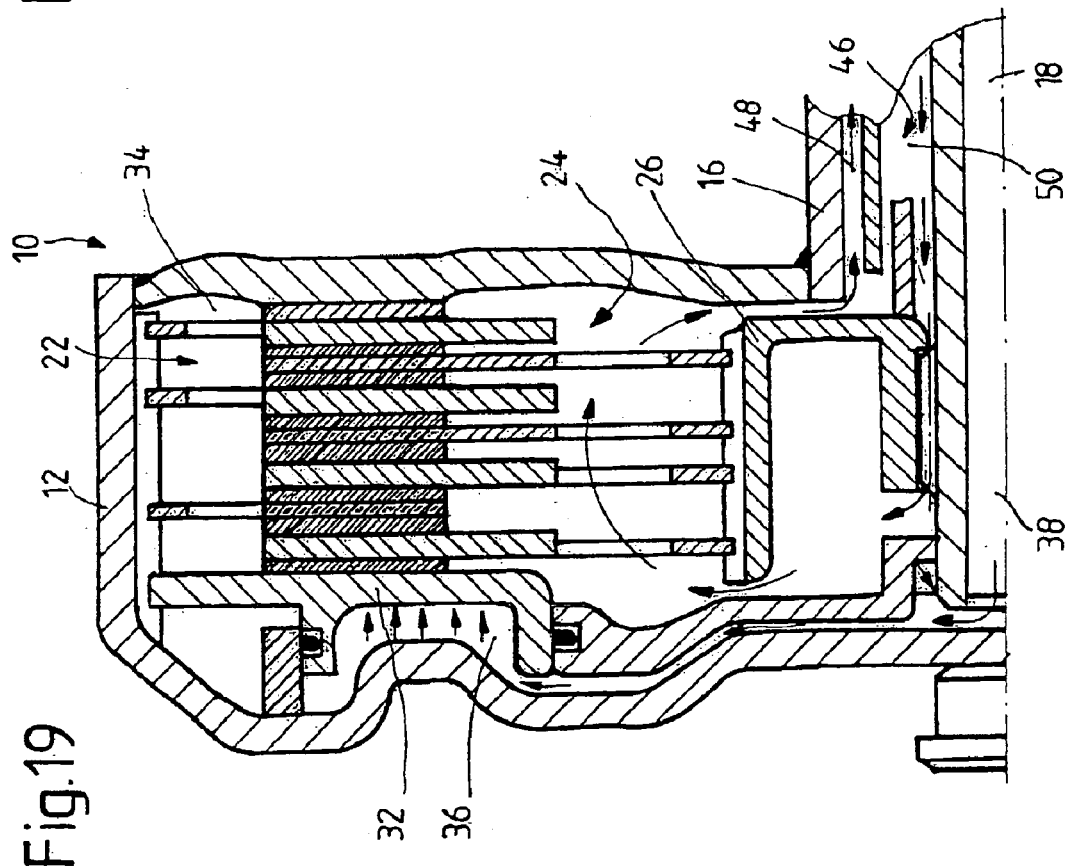

The embodiment according to FIG. 20 operates in accordance with the "dual-line principle". The fluid is fed into the housing arrangement 12 via the central opening 38 in the output shaft 18, specifically into the space region 36. Fluid enters, with a constricting action being provided, into the space region 34 via one or more openings 130 in the clutch piston 32 and can flow off again via a space region 51 provided between the hub 16 and the output shaft 18. To engage this clutch arrangement 10, fluid is therefore fed intensely into the space region 36. Owing to the increase in the fluid pressure in this space region 36, the clutch piston 32 is then pressed against the friction elements. It is possible here to reverse the direction of flow of the fluid in order to obtain a more rapid disengagement process. By means of the provision of the at least one opening 130, an exchange of fluid and a corresponding removal of heat is also continuously possible here in the engaged state. Although the desired leakage of fluid (caused by the opening or openings 130) has the consequence of reduced efficiency since oil has to be continuously fed back in, with a low outlay on construction a continuous exchange of fluid is possible.

Figure 21:
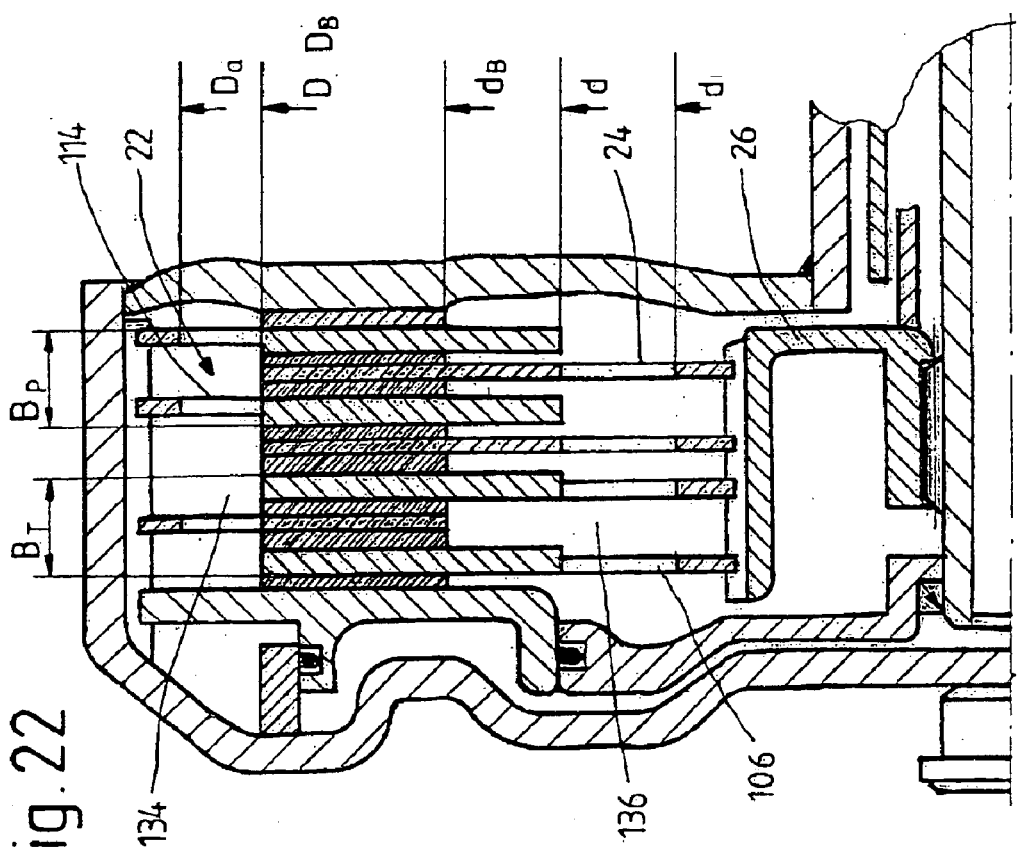

The design variant illustrated in FIG. 21 corresponds essentially to the design variant which is illustrated in FIG. 20, in which fluid is fed into the space region 36 via the central opening 38 in the output shaft 18.

However, a passage opening is not provided in the clutch piston 32. There is thus no direct connection for the exchange of fluid between the two space regions 34, 36. In this variant, the space region 34 is filled with fluid in advance. The removal of heat from the regions which are acted upon frictionally takes place here merely by means of the circulation of fluid which has been built up in accordance with the invention in the region of the various friction elements. There is no exchange of fluid, by means of which fluid is removed from the space region 34. In order to be able to compensate here for the change in volume of the space region 34, which is induced by displacement of the clutch piston 32, said space region 34 is not completely filled with the working fluid, i.e. an oil-like liquid or the like, with the result that a compressible volume of gas remains.

Figure 22:
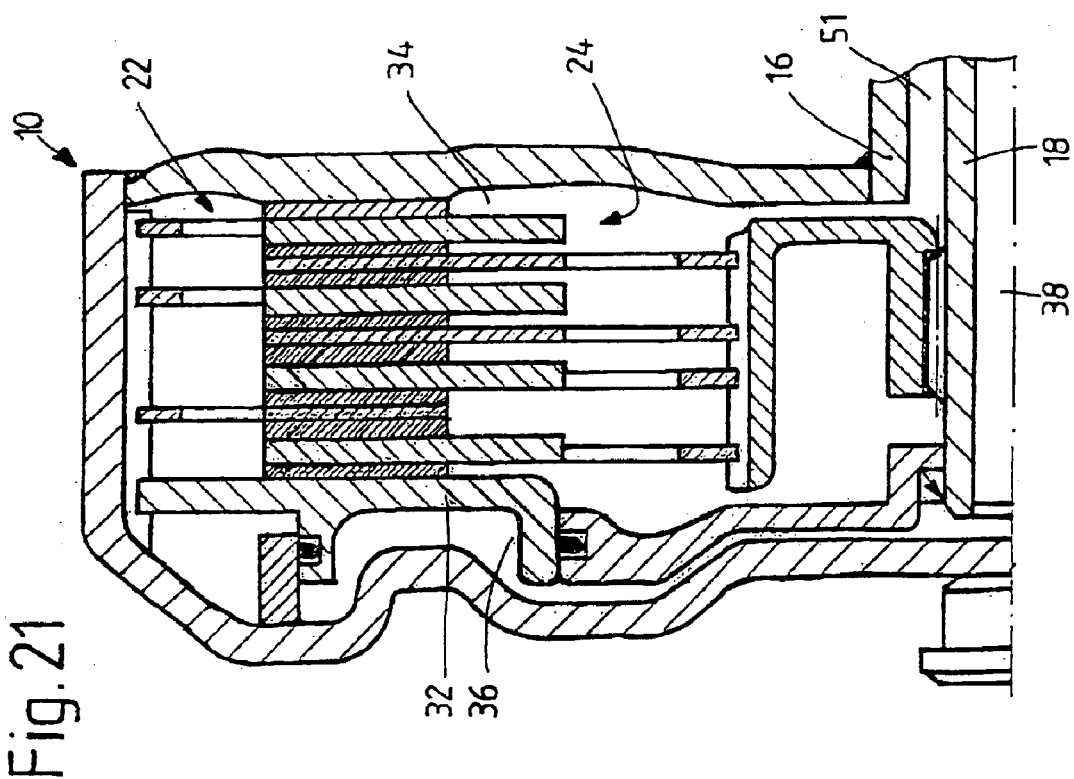
FIG. 22 shows a view of a partial longitudinal section of a clutch arrangement according to the invention used to illustrate various dimensions.

FIG. 22 illustrates various dimensions which are to lie within certain ranges in order to obtain an efficient circulation of fluid. It is therefore, for example, advantageous if the ratio of the internal diameter to the external diameter of the fluid-conveying surfaces ultimately causing the fluid to circulate, i.e. the ratio d/D, is in the region of 0.35–0.85, preferably around approximately 0.6. The number of effective fluid-conveying surfaces should be in the region of 6–48, preferably around approximately 24. For the friction linings, it has proven advantageous if their diameter ratio $d_B/D_B$ is in the region of 0.6–0.9, preferably around approximately 0.75.

The provision of the previously discussed, various openings 114, 106, which are provided radially on the outside and inside, or of passage cutouts between respective coupling projections causes the formation of the radially outer and radially inner fluid flow spaces 134, 136, which have already been previously discussed. These can be formed radially to the outside or radially to the inside by the various ring sections, which have previously been discussed, of the friction lining carriers 56, but may, as can also be seen, for example, in FIG. 1, be bounded directly by the housing arrangement 12 or by the coupling element 26. For these radially outer and radially inner fluid flow spaces, in which the fluid flows approximately in the axial direction, it has proven advantageous to provide a value in the region of 1.03–1.2, preferably approximately 1.1, as a ratio to the external dimension of the fluid-conveying surfaces, i.e. a ratio $D_a/D$, or to provide a value in the region of 0.4–0.9, preferably approximately 0.7, as a ratio to the internal diameter of the fluid-conveying surfaces, i.e. as a ratio $d_i/d$. Furthermore, it is advantageous if the ratio of the axial extent of the friction elements acting in the manner of a pump, which is expressed approximately by the dimension $B_P$ in FIG. 22, to the axial extent of the friction elements which are effective in the manner of a turbine, expressed approximately by the extent $B_P$ in FIG. 22, is in the region of 0.5–1.2, preferably approximately around 1. It should also be emphasized here that, in FIG. 22, there is a slight inaccuracy insofar as a friction element 24 which is coupled radially on the inside in a rotationally fixed manner to the coupling element 26, but does not contribute to causing the fluid to circulate, is situated between two friction elements 22 effective in the manner of a pump. The same also applies to the region which is effective in the manner of a turbine.

It has furthermore turned out to be advantageous, but not compulsory, if, as illustrated in FIG. 22, the friction linings end radially on the outside in the same region as the fluid-conveying surfaces on the various lining carriers.

It should be emphasized that the details which have been described above with reference to FIGS. 19–22 are independent of the manner in which the fluid-conveying surfaces which cause the fluid to circulate are formed, i.e. are independent of whether said fluid-conveying surfaces are formed on lining carriers or on end or side surfaces of linings themselves. In this respect, the statements which have been put forward with regard to FIGS. 19–22 likewise apply to the embodiments according to FIGS. 6–11.

Figure 23:
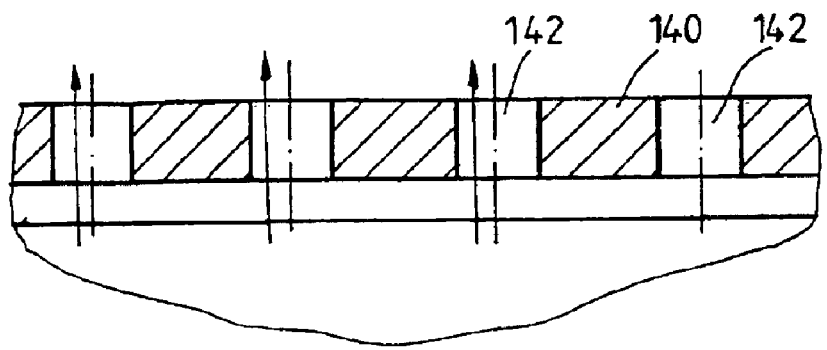
FIG. 23 shows a view of a partial longitudinal section of an outer disk carrier.

A further advantageous variant is indicated in FIG. 23. As already explained previously with regard to FIGS. 19–21, it is ensured, by various flows or advance filling, that there is working fluid in the region of the surface-area regions which bear frictionally against one another or can be brought into interaction, in order to remove heat by the flow of fluid or/and circulation of fluid. However, in a state in which the clutch 10 is not engaged, this function of removal of heat is not required. Since working fluid which is still present then has the effect of building up dragging torques, which is disadvantageous, for example, if the clutch according to the invention is effective as part of a double clutch. In this case, a torque is to be transmitted via just one of the clutches in each case. According to the variant illustrated in FIG. 23, it is now ensured that the volume region containing the surface-area regions which are acted upon frictionally is filled with working fluid only if a torque is to be transmitted. This can be achieved, for example, by a coupling element 140, which is formed separately from the housing arrangement 12, being provided for the friction elements, which are coupled in a rotationally fixed manner to the housing arrangement 12, said coupling being connected in a rotationally fixed manner to the housing arrangement 140, for example. This coupling element 140 has a plurality of passage openings 142 through which fluid can flow radially from the inside to radially on the outside. During operation, it is ensured that if the clutch is to be brought into an engaged state, fluid is conducted into the space region 34, specifically, for example, at a conveying rate of approximately 20 l/min. This fluid will be caused by centrifugal forces to flow radially outward and, owing to the constricting action of the openings 142, will accumulate more intensively in the volume region surrounded by the coupling element 140. At this point, it absorbs heat from the components bearing frictionally against one another and then removes the heat from the space region 34 after passing through the openings 142 and after the outlet. If the clutch is to be brought again into a disengaged state, the supply of fluid is stopped, the fluid which is initially still present will pass via the openings 142 and will then be removed. There is then no longer any dragging effect caused by the fluid. A design of this type is also possible, of course, in the case of the variant which is illustrated in FIG. 9, in which the friction elements 24a which are attached to the output shaft are attached to the coupling element 26a which surrounds the various friction elements 24a, 22a radially on the outside.

The manner in which the fluid-conveying surfaces are provided is also again insignificant here, and so this aspect of the present invention may in principle also be used in all of the previously described design variants.

Figure 24:
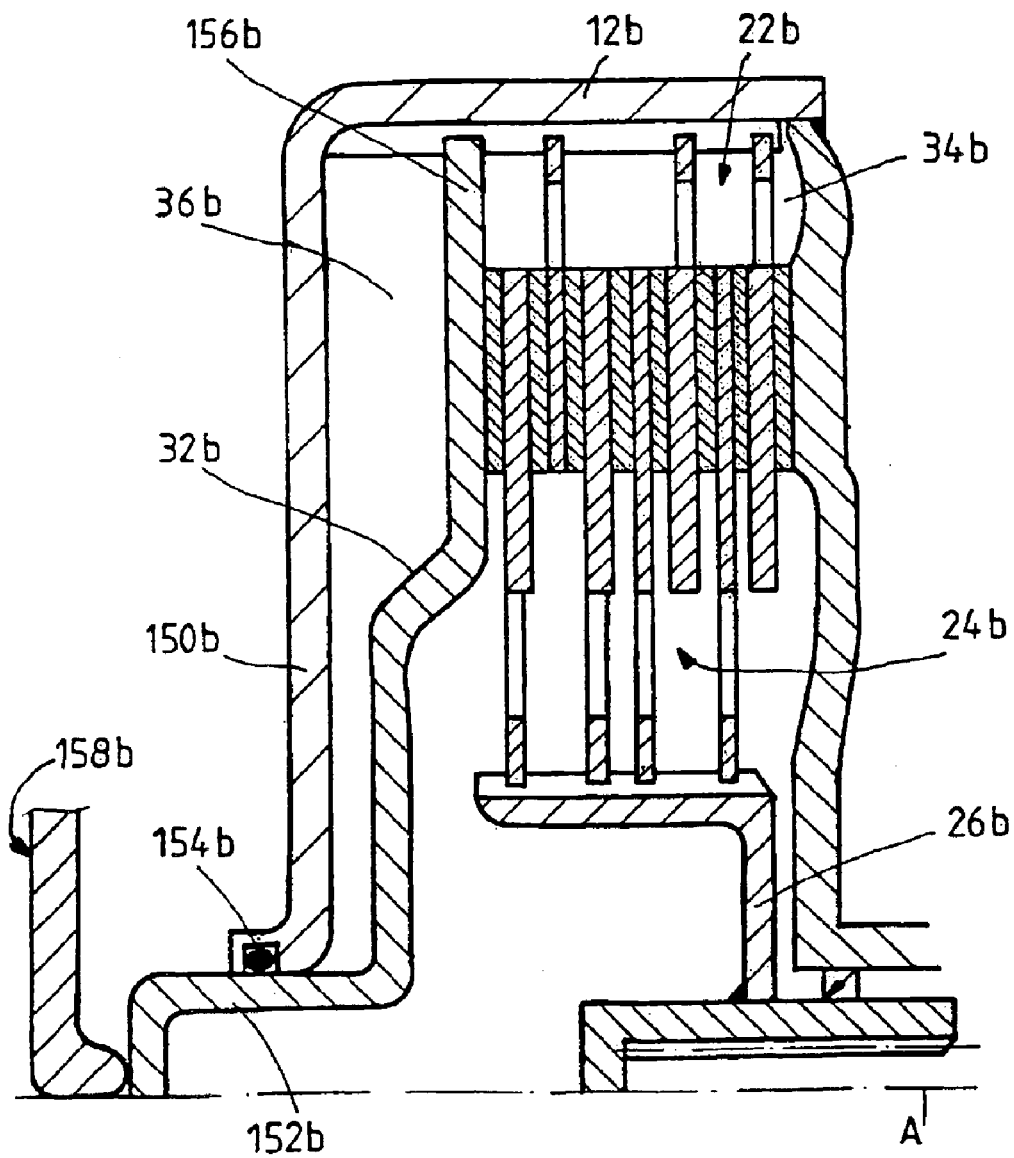
FIG. 24 shows a view of a partial longitudinal section of a clutch arrangement according to the invention according to an alternative embodiment.

A further clutch arrangement according to the invention is illustrated in FIG. 24. This corresponds to the previously described principles, in particular in respect of causing the fluid to circulate, and can, insofar as the friction elements are concerned, be designed in the manner as described previously with respect to various design variants.

It can be seen in the design variant illustrated in FIG. 24 that the housing section 150b, which lies opposite the clutch piston 32b and extends radially inward, has radially on the inside, an opening which is preferably concentric with the axis of rotation A. An axial formation 152b of the clutch piston 32, which formation extends essentially cylindrically and is formed by deformation, is guided through said opening with a sealing element 154b providing a sealing effect. The entire interior of the housing 12b which surrounds the space regions 34b, 36b is therefore sealed off in a fluid-tight manner and filled in advance with fluid. The two space regions 34b, 36b are directly connected radially on the outside, since the clutch piston 32b is, in the same manner as the friction elements 22b, attached there in a rotationally fixed manner to the housing arrangement 12b by a toothing arrangement 156b provided on said clutch piston. An actuating mechanism referred to in general by 158b is provided for the clutch piston 32b. Said actuating mechanism can be designed, for example, in the manner of a conventional piston/cylinder actuating mechanism for actuating friction clutches, in the manner of an energy accumulator, for example a diaphragm spring, or of another actuator. The mechanism 158b acts upon that region 152b of the clutch piston 32b which projects out of the housing arrangement 12b, and therefore presses said clutch piston against the various friction elements 22b, 24b in order to produce the engaged state. Fluid lines serving to produce the engaged state are thus not required here, which substantially simplifies the design especially with regard to conducting the fluid. In order to move the clutch piston away from the friction elements in a defined manner during the transfer into the disengaged state, it could be conceivable to provide either within the housing arrangement 12b or outside the same a spring element which prestresses said housing arrangement axially and only has to have a comparatively small spring force.

The design variant illustrated in FIG. 24 combines the principle of a wet clutch, i.e. a clutch cooled by fluid flowing around it, with the actuation of a conventional dry friction clutch. A clutch arrangement of this type can therefore be used, for example, where although a conventional actuation, i.e. actuation of a conventional dry friction clutch, is to be provided, the intended purpose of use means that the load which occurs in particular in slip mode would be too large for a dry friction clutch. It should also be emphasized that, of course, in the embodiment according to FIG. 24, all of the measures described previously can be provided in respect of the construction and effect of the friction elements.

Figure 25:
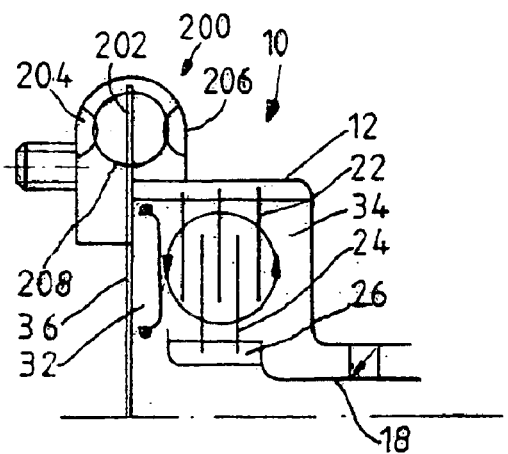
FIGS. 25–30 show further embodiments of the clutch arrangement according to the invention in conjunction with a torsional-vibration damper or a starter-generator arrangement.

A development of the clutch arrangement according to the invention is illustrated in FIG. 25. It can be seen here that the housing arrangement 12 of the clutch arrangement 10 can be coupled via a torsional-vibration damper, referred to in general by 200, to a drive shaft or other driving element for rotation together. For this purpose, the housing arrangement 12 has a region 202 which is extended radially outward in a flange-like manner and forms the secondary side of the torsional-vibration damper 200. Cover elements 204, 206 essentially forming the primary side are provided on the two axial sides of the region 200 which is extended in a flange-like manner. In a manner known per se, a plurality of damper springs 208 act between the cover elements 204, 206 and the flange-like region which is extended radially outward, with the result that the housing arrangement 12 can rotate within a limited angle of rotation range towards the cover elements 204, 206 which essentially form the primary side. This primary side can then be attached to the drive shaft via a flexiplate or the like.

Figure 26:
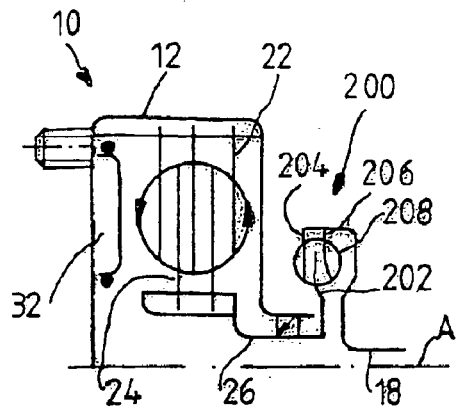

In the design variant illustrated in FIG. 26, the torsional-vibration damper 200 is provided on the output side and lies in the torque transmission path between the coupling element 26 and the output shaft 18 (illustrated schematically). In this case, the housing arrangement 12 is attached directly to the drive shaft, for example via a flexiplate. The torsional-vibration damper 200 is again constructed in accordance with a conventional type of construction and, for example, has connected to the coupling element 26 a flange-like central disk element in the manner of the region 202, which can be seen in FIG. 25, and two covering disk elements 204, 206 which are situated on both axial sides thereof and may, of course, also be formed integrally with each other.

Figure 27:
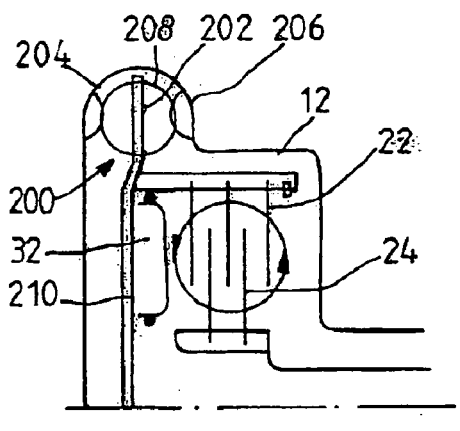
Figure 28:
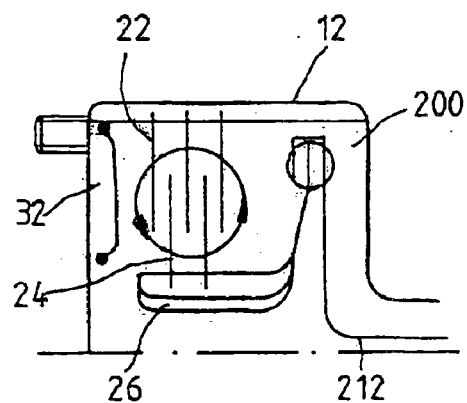

In the embodiment illustrated in FIG. 27, the torsional-vibration damper 200 is provided in the interior region of the housing arrangement 12, i.e. in the space region which is filled with working liquid. A carrier element, which is referred to in general by 210, carries both the friction elements 22 and the clutch piston 32 in a rotationally fixed manner. In its radially outer region, this carrier element 210 then forms the central element 200, on the two sides of which cover elements 204, 206, which are formed integrally with the housing arrangement 12, are provided for interaction with the damper springs 208. The torsional-vibration damper 200 is also provided here on the drive side, i.e. in the torque transmission path between the drive shaft and the friction elements 22. In the design variant illustrated in FIG. 28, the torsional-vibration damper 200 is again arranged within the housing arrangement 12, but now on the output side between the coupling element 26 and a further coupling element 212, which is then coupled in a rotationally fixed manner to the output shaft.

Figure 29:
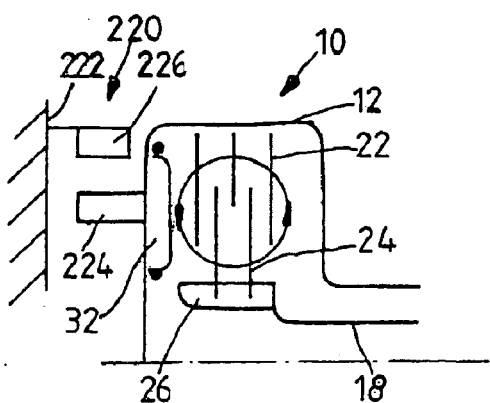

FIG. 29 illustrates a clutch arrangement 10 according to the invention in conjunction with a starter-generator arrangement, which is referred to in general by 220. On the side facing an engine block 222, the housing arrangement carries a rotor arrangement 224 of the starter-generator arrangement, which can also be coupled, for example via the torsional-vibration damper 200, to the housing arrangement 12 for rotation together. The stator arrangement 226, which has conducting coils, of the starter-generator arrangement 220 lies either radially within or, as in the example illustrated, radially outside the rotor arrangement 24. The stator arrangement 226 is held in a rotationally fixed manner, for example, on the engine block 222.

Figure 30:
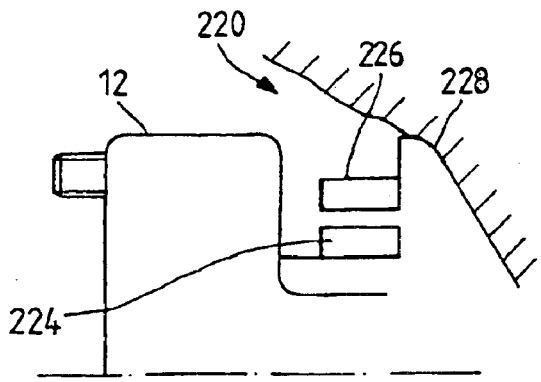

In the design variant illustrated in FIG. 30, the rotor arrangement 224 is arranged on the output side of the housing arrangement 12. The stator arrangement 226 is carried, for example, on the inside of a transmission bell 228.

It should be emphasized that, in the embodiments described with reference to FIGS. 25–30, the inner construction of the clutch arrangements can be designed as previously described with reference to FIGS. 1–24, in particular as far as the various friction elements are concerned. In this case too, as indicated by circulation circles, the circulation of fluid which flows around the friction elements is provided. It is self-evident to provide both the torsional-vibration damper 200 and the starter-generator arrangement 220 in a clutch arrangement 10 according to the invention. For example, it is possible to couple a drive shaft via a flexiplate or the like to the rotor arrangement of the starter-generator arrangement, to couple the rotor arrangement to the input side or primary side of the torsional-vibration damper and then to couple the output side of the torsional-vibration damper to the housing arrangement of the clutch arrangement according to the invention.

It should furthermore be emphasized that the principle of the invention of causing fluid to circulate in the region of friction elements which can be brought frictionally into action with one another may, of course, also be used in double wet clutch arrangements, in which two sets of friction elements can be used to bring two different output shafts into a torque-transmitting connection with a drive shaft by alternate engagement of one of the two wet clutches.

We claim:

1. A clutch arrangement comprising:
   a housing which can rotate about an axis and is at least substantially filled with fluid;
   at least one first friction element which is fixed against rotation with respect to the housing;
   an output element which can rotate about said axis with respect to said housing; and
   at least one second friction element which is fixed against rotation with respect to the output element and can frictionally engage at least one said first friction element;
   wherein at least one said first friction element and at least one said second friction element each have a plurality of fluid conveying surfaces and a plurality of axially extending fluid passage openings, said fluid conveying surfaces each having a radial component and an axial component, said fluid conveying surfaces of said first friction element guiding fluid radially outward and said fluid conveying surfaces of said second friction element conducting the fluid radially inward when the housing rotates faster than the output element, thereby causing a circulation of fluid around at least some areas of said friction elements via said fluid passage openings.

2. A clutch arrangement as in claim 1, wherein each said fluid conveying surface has at least one region with a surface perpendicular oriented tangentially to a circumferential circular line.

3. A clutch arrangement as in claim 1, wherein at least one of said first and second friction elements has at least one axial side provided with a friction lining having at least one said fluid conveying surface.

4. A clutch arrangement as in claim 3, wherein each said friction lining has a groove-like channel with at least one circumferentially extending wall forming a respective said fluid conveying surface.

5. A clutch arrangement as in claim 3, wherein at least one of said first and second friction elements has a friction lining having at least one fluid conveying surface provided on both axial sides.

6. A clutch arrangement as in claim 3, wherein at least one of said first and second friction elements has a first axial side provided with a friction lining having at least one said fluid conveying surface, and a second axial side without friction lining, a further at least one of said friction elements having a friction lining facing said second axial side.

7. A clutch arrangement as in claim 1, wherein at least one of said first and second friction elements comprises a friction lining carrier having at least one axial side carrying a friction lining and having at least one said fluid conveying surface.

8. A friction clutch arrangement as in claim 7, wherein each said friction lining carrier has a plurality of circumferentially arranged lining carrying sections connected by connecting sections so that adjacent lining carrying sections are axially offset, each said connecting section providing a respective said fluid conveying surface.

9. A friction clutch arrangement as in claim 8, wherein each said friction lining carrier is formed from an essentially ring-like sheet metal blank.

10. A friction clutch arrangement as in claim 8, wherein said friction lining comprises a plurality of lining segments and wherein adjacent lining carrying sections have oppositely facing axial sides, each said side carrying a respective lining segment.

11. A fluid clutch arrangement as in claim 1, wherein said fluid conveying surfaces are circumferentially arranged.

12. A fluid clutch arrangement as in claim 1, further comprising a pressing element for bringing said first and second friction elements into frictional engagement, said housing having an interior region which is divided into a first space region and a second space region by said pressing element, said first space region containing said friction elements.

13. A fluid clutch arrangement as in claim 12, further comprising a fluid flow arrangement which can feed fluid into said first space region and remove fluid from said first space region essentially independently of said circulation of fluid.

14. A fluid clutch arrangement as in claim 12, wherein said first space region is sealed off from said second space region with respect to fluid exchange.

15. A fluid clutch arrangement as in claim 12, further comprising means for introducing fluid into said second space region so that said pressing element produces said frictional engagement.

16. A friction clutch arrangement as in claim 12, further comprising an actuating arrangement provided outside of said housing for acting on said pressing element in order to produce said frictional engagement.

17. A friction clutch arrangement as in claim 1, wherein at least one of said first and second friction elements comprises a friction lining carrier having a tab-like bent section which causes said fluid to circulate.

18. A friction clutch arrangement as in claim 1, wherein each said at least one of said first and second friction elements comprises 6 to 48 fluid conveying surfaces.

19. A fluid clutch arrangement as in claim 1, wherein each said fluid-conveying surface has an internal diameter d, an external diameter D, and a ratio d/D of 0.35 to 0.85, said fluid clutch arrangement further comprising an outer fluid deflecting space lying outside of said fluid conveying surface and having an external diameter D, with a ratio $D_a/D$ of 1.03 to 1.20, and an internal fluid-deflecting space with an internal diameter $d_i$ with a ratio $d_i/d$ of 0.4 to 0.9.

20. A fluid clutch arrangement as in claim 1, wherein each said first friction element has a region of axial extent contributing to said circulation and having a first axial dimension, and wherein each said second friction element has a region of axial extent contributing to said circulation and having a second axial dimension, the ratio of the first axial dimension to the second axial dimension being 0.5 to 1.2.

21. A clutch arrangement as in claim 1, further comprising a friction lining arrangement provided on at least one of said first and second friction elements, said friction lining having an internal dimension $d_B$ and an external dimension $D_B$ in a ratio $d_B/D_B$ of 0.6 to 0.9.

22. A friction clutch arrangement as in claim 1 wherein said housing is completely filled with said fluid.

23. A friction clutch arrangement as in claim 1 wherein said fluid is an oil-like liquid.

24. A friction clutch arrangement as in claim 1 wherein each said first friction element has a plurality of radially outward extending coupling projections which engage said housing.

25. A friction clutch arrangement as in claim 24 wherein said axial through passages of said at least one first friction element are between said coupling projections.

26. A friction clutch arrangement as in claim 1 wherein each said second friction element has a plurality of radially inward extending coupling projections which engage said output element.

27. A friction clutch arrangement as in claim 26 wherein said axial through passages of said at least one second friction element are between said coupling projections.

28. A clutch arrangement comprising:

a housing which can rotate about an axis and is at least substantially filled with fluid;

at least one first friction element which is fixed against rotation with respect to the housing;

an output element which can rotate about said axis with respect to said housing; and at least one second friction element which is fixed against rotation with respect to the output element and can frictionally engage at least one said first friction element;

a pressing element arranged displaceably in said housing for bringing said first and second friction elements into frictional engagement, and an actuating arrangement provided outside of said housing for acting on said pressing element in order to produce said frictional engagement;

wherein at least one said first friction element and at least one said second friction element each have a plurality of fluid conveying surfaces and a plurality of axially extending fluid passage openings said fluid conveying surfaces each having a radial component and an axial component, said fluid conveying surfaces of said first friction element guiding fluid radially outward and said fluid conveying surfaces of said second friction element conducting the fluid radially inward when the housing rotates faster than the output element, thereby causing a circulation of fluid around at least some areas of said friction elements via said fluid passage openings.

29. A friction clutch arrangement as in claim 28, wherein said housing is sealed off with respect to exchange of fluid.

30. A clutch arrangement as in claim 28, further comprising a torsional vibration damper in at least one of a torque transmission path between a drive element to be coupled to the housing and the at least one first friction element, and a torque transmission path between the at least one second friction element and the output element.

31. A clutch arrangement as in claim 28, further comprising a starter generator arrangement comprising a rotor having a plurality of permanent magnets coupled to the housing for rotation with said housing.

* * * * *